US012007138B2

(12) United States Patent
Nanjappa et al.

(10) Patent No.: US 12,007,138 B2
(45) Date of Patent: Jun. 11, 2024

(54) REMOVABLE ENERGY RECOVERY WHEEL ASSEMBLY FOR AN HVAC SYSTEM

(71) Applicant: Johnson Controls Technology Company, Auburn Hills, MI (US)

(72) Inventors: Vinay Nanjappa, Bangalore (IN); Marcel P. Ferrere, Jr., Dalmatia, PA (US); Vishal S. Jagtap, Thane (IN); Vijay A R, Bangalore (IN); Chandra S. Yelamanchili, York, PA (US); Curtis W. Caskey, Dallastown, PA (US); Rajiv K. Karkhanis, York, PA (US)

(73) Assignee: Tyco Fire & Security GmbH, Schaffhausen (CH)

( * ) Notice: Subject to any disclaimer, the term of this patent is extended or adjusted under 35 U.S.C. 154(b) by 266 days.

(21) Appl. No.: 17/240,749

(22) Filed: Apr. 26, 2021

(65) Prior Publication Data

US 2021/0247097 A1  Aug. 12, 2021

Related U.S. Application Data

(63) Continuation of application No. 16/234,318, filed on Dec. 27, 2018, now Pat. No. 10,989,434.

(Continued)

(51) Int. Cl.
*F24F 13/00* (2006.01)
*F24F 12/00* (2006.01)
(Continued)

(52) U.S. Cl.
CPC ............ *F24F 12/001* (2013.01); *F24F 13/15* (2013.01); *F24F 13/28* (2013.01); *F24F 2203/104* (2013.01)

(58) Field of Classification Search
CPC .......... F24F 12/001; F24F 13/15; F24F 13/28; F24F 2203/104; F24F 2203/1044; F24F 2203/108; F24F 2012/007; F24F 2003/1464; F24F 7/08; F28F 2280/00; F28F 2280/02; F28F 2280/06; F28F 2280/10; F28D 19/042
See application file for complete search history.

(56) References Cited

U.S. PATENT DOCUMENTS 1,787,444 A   1/1931  French
2,615,687 A  10/1952  Simmons
(Continued)

FOREIGN PATENT DOCUMENTS

KR   20140065908 A   5/2014

*Primary Examiner* — Travis Ruby
(74) *Attorney, Agent, or Firm* — Fletcher Yoder, P.C.

(57) ABSTRACT

A heating, ventilation, and/or air conditioning (HVAC) system includes an enclosure that is divided by a partition extending between a first panel and a second panel of the enclosure such that the partition defines an outdoor air flow path and a return air flow path through the enclosure. The partition includes an opening extending between the outdoor airflow path and the return airflow path. The HVAC system also includes an energy recovery wheel that translatably extends through the opening and is positioned within the outdoor air flow path and the return air flow path. The energy recovery wheel is disposed within the enclosure at an oblique angle relative to the outdoor air flow path and the return air flow path.

20 Claims, 20 Drawing Sheets

Related U.S. Application Data

(60) Provisional application No. 62/782,860, filed on Dec. 20, 2018.

(51) Int. Cl.
*F24F 13/15* (2006.01)
*F24F 13/28* (2006.01)

(56) References Cited

U.S. PATENT DOCUMENTS

| | | |
|---|---|---|
| 3,017,160 A | 1/1962 | Lee et al. |
| 3,447,598 A | 6/1969 | Kaess, Jr. |
| 3,494,113 A | 2/1970 | Kinney |
| 3,672,128 A | 6/1972 | Heffron |
| 4,415,019 A | 11/1983 | Hunzicker |
| 4,473,108 A | 9/1984 | Jansson et al. |
| 4,924,934 A | 5/1990 | Steele |
| 5,285,842 A | 2/1994 | Chagnot |
| 5,423,187 A | 6/1995 | Fournier |
| 5,632,954 A | 5/1997 | Coellner et al. |
| 5,649,428 A | 7/1997 | Calton et al. |
| 5,758,511 A | 6/1998 | Yoho et al. |
| 5,826,641 A | 10/1998 | Bierwirth et al. |
| 6,039,109 A | 3/2000 | Chagnot et al. |
| 6,196,469 B1 | 3/2001 | Pearson |
| 6,199,388 B1 | 3/2001 | Fischer, Jr. |
| 6,264,713 B1 | 7/2001 | Lewis, II |
| 6,319,307 B1 | 11/2001 | Shanks et al. |
| 6,328,095 B1 | 12/2001 | Felber et al. |
| 7,252,696 B2 | 8/2007 | Jenkins et al. |
| 7,263,850 B2 | 9/2007 | Eom et al. |
| 7,484,381 B2 | 2/2009 | Lattanzio |
| 8,157,881 B1 | 4/2012 | Anoszko et al. |
| 8,211,198 B2 | 7/2012 | Weber et al. |
| 8,388,717 B2 | 3/2013 | Livingstone et al. |
| 9,114,342 B2 | 8/2015 | Schuld et al. |
| 9,395,097 B2 | 7/2016 | McKie et al. |
| 9,772,036 B2 | 9/2017 | Erb et al. |
| 9,816,724 B2 | 11/2017 | Phannavong et al. |
| 2003/0070787 A1 | 4/2003 | Moffitt |
| 2005/0061026 A1 | 3/2005 | Choi |
| 2008/0108295 A1 | 5/2008 | Fischer et al. |
| 2008/0230206 A1 | 9/2008 | Lestage et al. |
| 2009/0011885 A1 | 1/2009 | Robinson |
| 2010/0314083 A1 | 12/2010 | Williams |
| 2011/0284185 A1 | 11/2011 | Cullen et al. |
| 2012/0291992 A1 | 11/2012 | Hoagland et al. |
| 2013/0092345 A1 | 4/2013 | McKie et al. |
| 2013/0116951 A1 | 5/2013 | McKie et al. |
| 2013/0186277 A1 | 7/2013 | Fujioka |
| 2013/0327510 A1 | 12/2013 | Kamiyama et al. |
| 2016/0169544 A1 | 6/2016 | Fischer et al. |
| 2017/0356661 A1 | 12/2017 | Fischer |

REMOVABLE ENERGY RECOVERY WHEEL ASSEMBLY FOR AN HVAC SYSTEM

CROSS-REFERENCE TO RELATED APPLICATIONS

This is a continuation application of U.S. patent application Ser. No. 16/234,318, entitled "ENERGY RECOVERY WHEEL ASSEMBLY FOR AN HVAC SYSTEM," filed Dec. 27, 2018, which claims priority from and the benefit of U.S. Provisional Application Ser. No. 62/782,860, entitled "ENERGY RECOVERY WHEEL ASSEMBLY FOR AN HVAC SYSTEM," filed Dec. 20, 2018, each of which is hereby incorporated by reference in its entirety for all purposes.

BACKGROUND

This disclosure relates generally to heating, ventilation, and/or air conditioning (HVAC) systems. Specifically, the present disclosure relates to an energy recovery wheel assembly for HVAC units.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A heating, ventilation, and/or air conditioning (HVAC) system may be used to thermally regulate an environment, such as a building, home, or other structure. The HVAC system generally includes a vapor compression system that includes heat exchangers, such as a condenser and an evaporator, which transfer thermal energy between the HVAC system and the environment. In many cases, the HVAC system may direct a continuous flow of fresh outdoor air into a building to provide ventilation and improved air quality within the building, while stale return air of the building is discharged into an ambient environment, such as the atmosphere. The HVAC system may include an energy recovery wheel that is configured to recover energy from the return air prior to discharging the return air into the atmosphere, thus improving an efficiency of the HVAC system.

For example, the energy recovery wheel may be situated within and configured to rotate relative to a flow path of the return air and a flow path of the outdoor air. The energy recovery wheel typically includes heat transfer elements that are configured to transition between the return air flow path and the outdoor air flow path of the HVAC system as the energy recovery wheel rotates. The heat transfer elements are generally porous and enable air flowing therethrough to absorb thermal energy from or release thermal energy to the heat transfer elements. In cases when the HVAC system is operating in a cooling mode, the return air discharging from the building may be cooler than the outdoor air entering the HVAC system. Accordingly, when the energy recovery wheel rotates, the heat transfer elements may cyclically absorb thermal energy from the warmer outdoor air and subsequently release the absorbed thermal energy to the cooler return air passing through the return air flow path. As a result, the energy recovery wheel may pre-cool the outdoor air before the outdoor air flows across the evaporator of the HVAC system. In some cases, it is desirable to access the energy recovery wheel for maintenance or other purposes.

Unfortunately, energy recovery wheels of conventional HVAC systems may be difficult to access and typically involve significant disassembly of the HVAC system to enable cleaning, replacement, or other maintenance of the energy recovery wheel.

SUMMARY

The present disclosure relates to a heating, ventilation, and/or air conditioning (HVAC) system including an enclosure that is divided by a partition extending between a first panel and a second panel of the enclosure to define an outdoor air flow path and a return air flow path through the enclosure. The partition includes an opening extending between the outdoor airflow path and the return airflow path. The HVAC system also includes an energy recovery wheel that translatably extends through the opening and is positioned within the outdoor air flow path and the return air flow path. The energy recovery wheel is disposed within the enclosure at an oblique angle relative to the outdoor air flow path and the return air flow path.

The present disclosure also relates to a heating, ventilation, and/or air conditioning (HVAC) system including a partition that is configured to divide an enclosure into an outdoor air flow path and a return air flow path, where the partition includes an opening. The HVAC system includes a first support rail and a second support rail that are configured to extend through the opening and span across the outdoor air flow path and the return air flow path. An energy recovery wheel is configured to engage with and translate along the first support rail and the second support rail to enable translatable positioning of the energy recovery wheel within the outdoor air flow path and the return air flow path. The energy recovery wheel is configured to extend between the first support rail and the second support rail at an oblique angle relative to the outdoor air flow path and the return air flow path.

The present disclosure also relates to a rooftop unit for a heating, ventilation, and/or air conditioning (HVAC) system including an enclosure having a first side panel and a second side panel with a partition therebetween to define an outdoor air flow path and a return air flow path through the enclosure. The partition includes an opening defined therein, and a railing system extends through the opening between the first side panel and the second side panel of the enclosure. The rooftop unit also includes an energy recovery wheel that is translatably coupled to the railing system and disposed within the outdoor air flow path and the return air flow path at an oblique angle relative to the outdoor air flow path and the return air flow path. The energy recovery wheel is configured to translate along the railing system to enable removal or insertion of the energy recovery wheel via a lateral side of the enclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
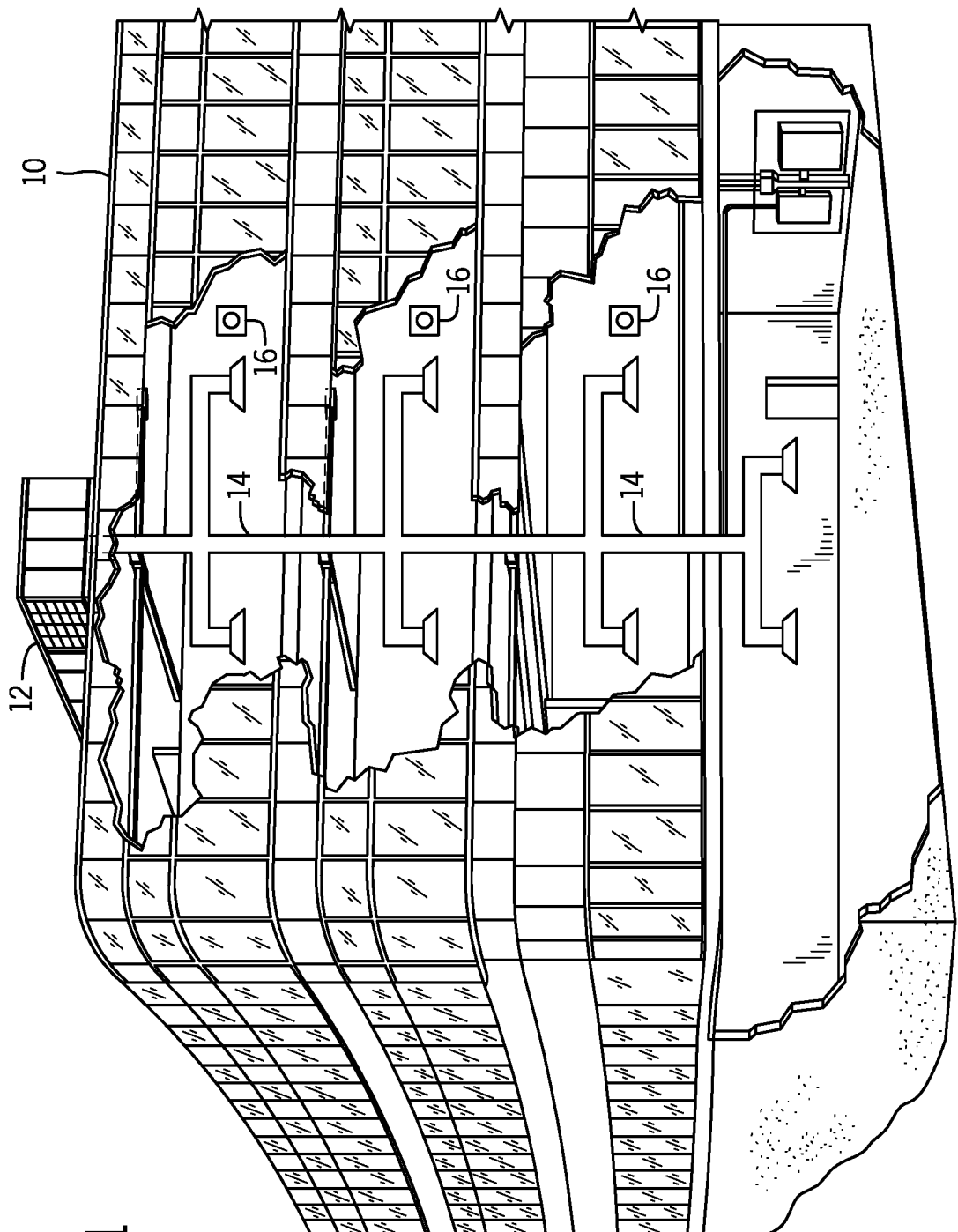
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As briefly discussed above, a heating, ventilation, and/or air conditioning (HVAC) system may be used to regulate certain climate parameters within a space of a building, home, or other suitable structure. In particular, the HVAC system may be used to exhaust stale return air from a building while simultaneously directing fresh outdoor air into the building. Accordingly, a continuous supply of fresh air may be circulated through an interior of the building to improve or maintain an air quality within the building. In some cases, the HVAC system may direct the return air discharging from the building across an energy recovery wheel, which may be configured to recover thermal energy from the return air before the return air is released into an ambient environment, such as the atmosphere.

For example, in some embodiments, the HVAC system may include an enclosure having a partition that extends along an interior of the enclosure to divide the enclosure into an outdoor air flow path and a return air flow path. Respective fans or blowers may be used to direct the outdoor air along the outdoor air flow path and direct the return air along the return air flow path. The partition may include an opening defined therein, which enables the energy recovery wheel to extend through the partition and span across the outdoor air flow path and the return air flow path. Accordingly, the outdoor air and the return air may flow across respective portions of the energy recovery wheel. The energy recovery wheel may include a plurality of heat transfer elements that are configured absorb or release thermal energy and/or moisture from the outdoor air and return air flows. The energy recovery wheel may be configured to rotate relative to the enclosure, such that the heat transfer elements may cyclically rotate into and out of the outdoor air flow path and the return air flow path. In this manner, the energy recovery wheel may transfer thermal energy and/or moisture from the outdoor air flowing along the outdoor air flow path to the return air flowing along the return air flow path, or vice versa.

As an example, in embodiments where the HVAC system is operating in a cooling mode, a temperature of the outdoor air entering the enclosure may be warmer than a temperature of the return air discharging from the building. The relatively cool return air may absorb thermal energy from the heat transfer elements of the energy recovery wheel positioned within the return air flow path, thereby decreasing a temperature of these heat transfer elements. Due to the rotational motion of the energy recovery wheel within the HVAC system, the cooled heat transfer elements may gradually rotate out of the return air flow path and into the outdoor air flow path. Accordingly, upon transitioning into the outdoor air flow path, the cooled heat transfer elements may absorb thermal energy from the warmer outdoor air flowing thereacross. As a result, the energy recovery wheel may be used to pre-cool or pre-condition the outdoor air before the outdoor air reaches other heat exchange components of the HVAC system, such as an evaporator assembly.

In certain cases, the outdoor air may also include a relatively high humidity value, as compared to a humidity value of the return air. In such cases, the energy recovery wheel may be used to dehumidify the outdoor air entering the HVAC system by transferring moisture from the outdoor air to the return air, in accordance with the techniques discussed above. That is, the heat transfer elements of the energy recovery wheel may be configured to absorb and release moisture, in addition to the absorption and release of thermal energy.

In some cases, certain contaminants may accumulate within the energy recovery wheel during operation of the HVAC system. For example, dust, pollen, or other foreign matter may aggregate within the energy recovery wheel and/or filters of the energy recovery wheel, such that cleaning and/or replacement of the energy recovery wheel and/or its components is desired. Moreover, repeated exposure to moisture may cause portions of the energy recovery wheel to degrade or incur wear over time. Unfortunately, energy recovery wheels of conventional HVAC systems are often difficult to access, and significant disassembly of the HVAC system may be involved to clean and/or replace the energy recovery wheel. Accordingly, maintenance operations on the energy recovery wheel may be time consuming and may render the HVAC system inoperable for a significant period of time. In addition, it may be difficult to position relatively large or oversized energy recovery wheels within conventional HVAC systems without increasing overall exterior dimensions of the HVAC system enclosure and/or without forming aesthetically unappealing protrusions along sections of the enclosure that house the energy recovery wheel.

It is now recognized that maintenance operations on the energy recovery wheel may be facilitated and improved by enabling removal and/or replacement of the energy recovery wheel without disassembly and/or removal of other HVAC system components adjacent the energy recovery wheel. Facilitating maintenance operations on the energy recovery wheel may reduce a time period between non-operational periods of the HVAC system, which may improve an overall efficiency of the HVAC system and/or may reduce costs associated with HVAC system maintenance. Moreover, it is recognized that positioning relatively large and/or oversized energy recovery wheels in a slanted configuration within the enclosure of the HVAC system may enable installation of such energy recovery wheels without alteration of external dimensions of the HVAC system enclosure.

Accordingly, embodiments of the present disclosure are directed to an energy recovery wheel assembly, referred to herein as an ERW assembly, which retains the energy recovery wheel within the HVAC system enclosure and enables removal of the energy recovery wheel from the enclosure for maintenance and/or replacement without involving traditional disassembly of HVAC system components disposed adjacent to the ERW assembly. In addition, the ERW assembly enables the energy recovery wheel to be oriented at an angle within the enclosure, such that a size of the energy recovery wheel may be increased without increasing a height or other exterior dimension of the enclosure.

For example, the ERW assembly may include a railing system having a first support rail that is coupled to a first or lower panel of the enclosure, and a second support rail that is coupled to a second or upper panel of the enclosure. The first support rail and the second support rail may extend through an opening of the partition to span between side panels of the enclosure, which extend between the first panel and the second panel to at least partially define the interior of the enclosure. The first and second support rails may be laterally offset from one another with respect to a length of the enclosure and may each include an angled section that faces a corresponding angled section of the other rail. Guide tracks may extend along a width of the angled sections and may be configured to engage with guide extensions that protrude from a frame assembly of the energy recovery wheel. In this manner, the first support rail and the second support rail may orient and secure the energy recovery wheel at an oblique angle relative to the first panel and the second panel of the enclosure. As described in detail below, the engagement between the guide tracks and the guide extensions also enables the energy recovery wheel to slide laterally, relative to the enclosure, along a width of the enclosure toward either of the side panels, while translational movement of the energy recovery wheel along the length and a height of the enclosure is substantially blocked. Accordingly, performance maintenance activities on the energy recovery wheel may be accomplished by removing an access panel within, for example, the first side panel of the enclosure and translating the energy recovery wheel along the railing system and through an opening created by the access panel to remove the energy recovery wheel from the interior of the enclosure. Additionally or alternatively, an actuator may be used to translate the energy recovery wheel along the railing system and out of the enclosure.

In some embodiments, the ERW assembly may include a pair of subframe assemblies that extend between the first and second support rails and are situated adjacent to the energy recovery wheel. The subframe assemblies may be situated on either side of the partition of the enclosure such that each subframe assembly is disposed within a respective one of the outdoor air flow path and the return air flow path. More specifically, the ERW assembly may include a first subframe assembly that is disposed within the outdoor air flow path and extends between the partition and a first side panel of the enclosure and a second subframe assembly that is disposed within the return air flow path and extends between the partition and a second side panel of the enclosure. The first subframe assembly may be disposed upstream of a first portion or section of the energy recovery wheel with respect to a flow direction of the outdoor air across the first portion, while the second subframe assembly is disposed upstream of a second portion or section of the energy recovery wheel with respect to a flow direction of return air across the second portion. As described in detail below, this configuration may enable filter elements of the first and second subframe assemblies to filter the outdoor air and the return air before these air flows traverse the energy recovery wheel. The first and second subframe assemblies may each include a respective bypass damper that is configured to enable the outdoor air, the return air, or both, to bypass the energy recovery wheel during certain operational modes of the HVAC system, such as when the energy recovery wheel is inactive or non-operational. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
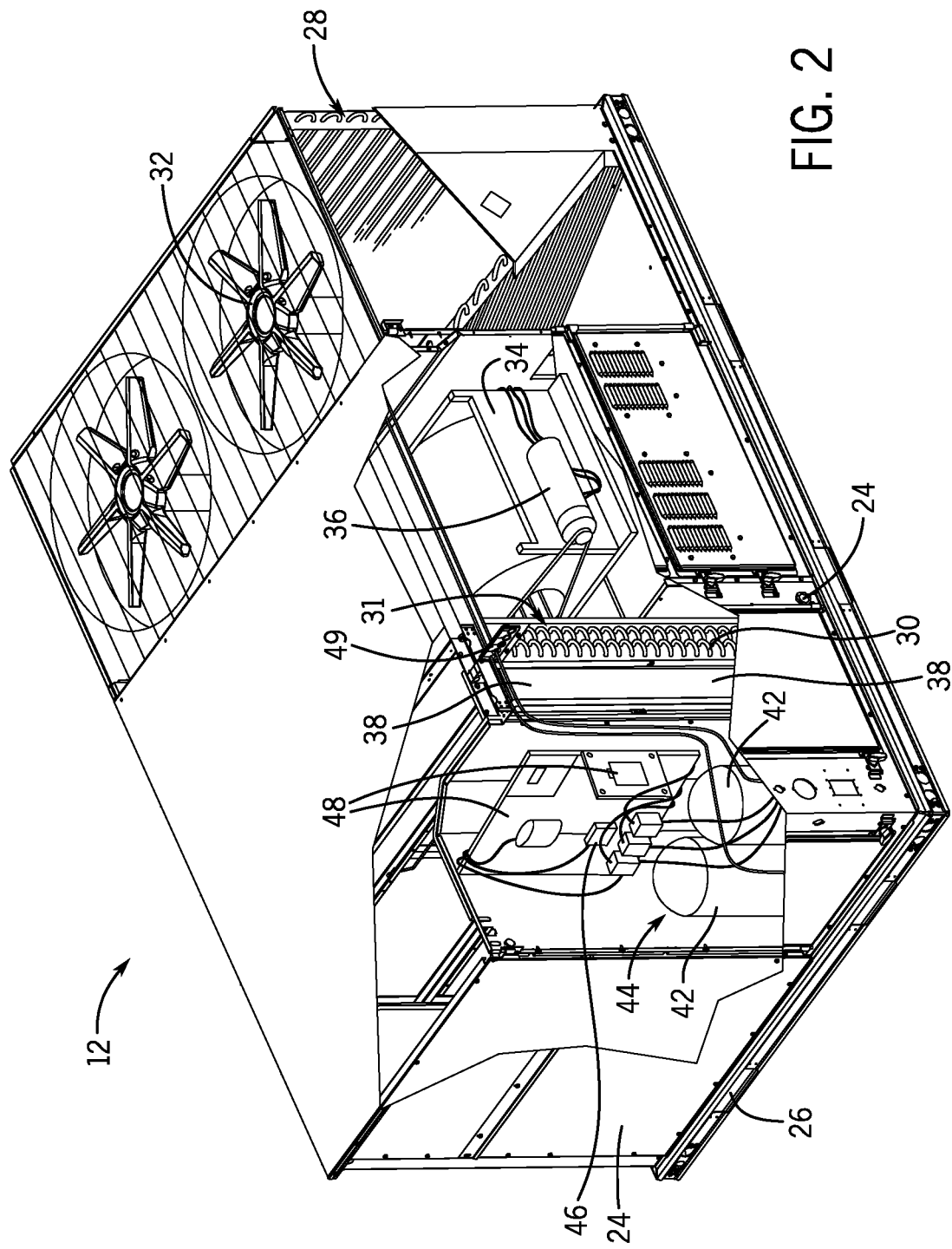
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
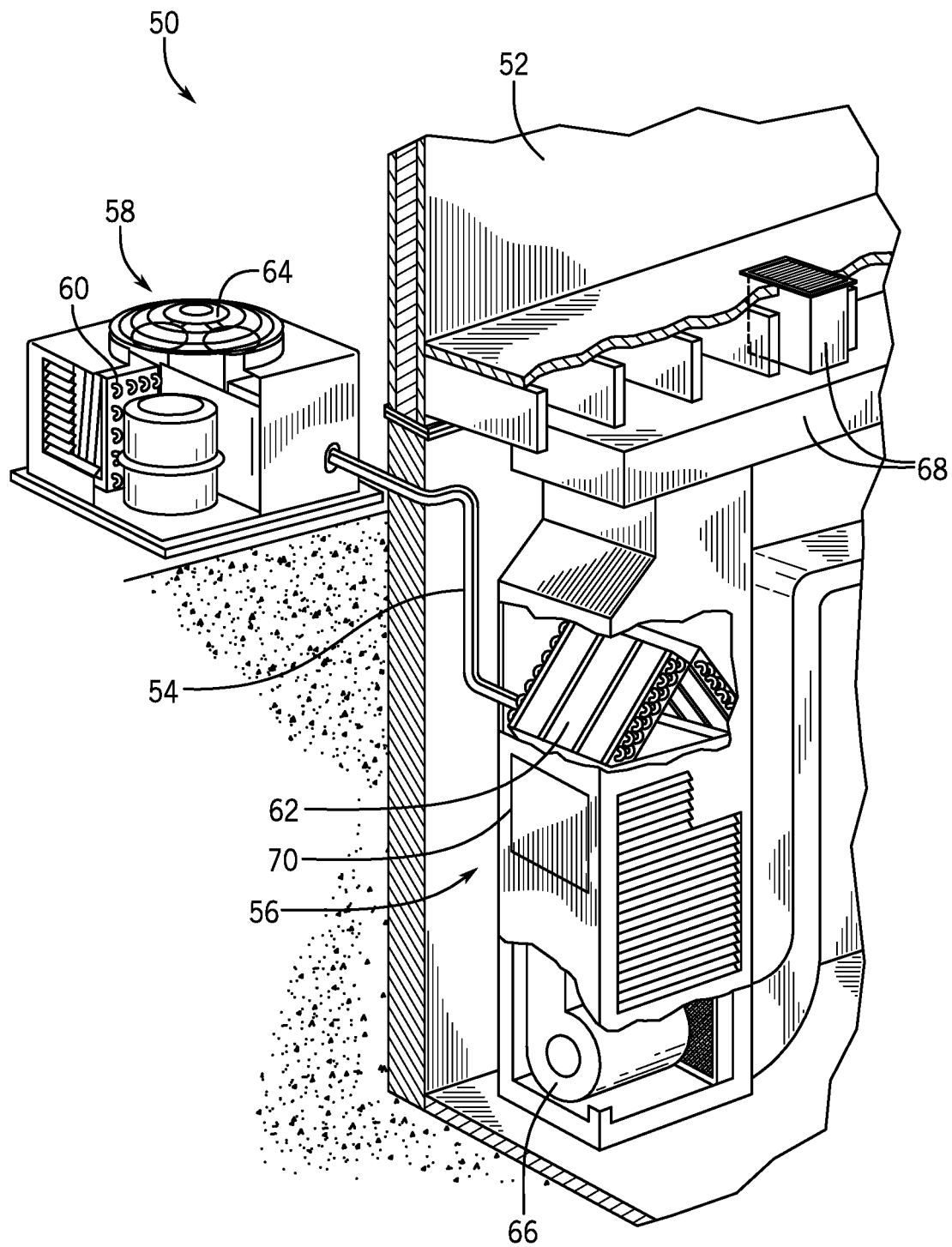
FIG. 3 is a perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
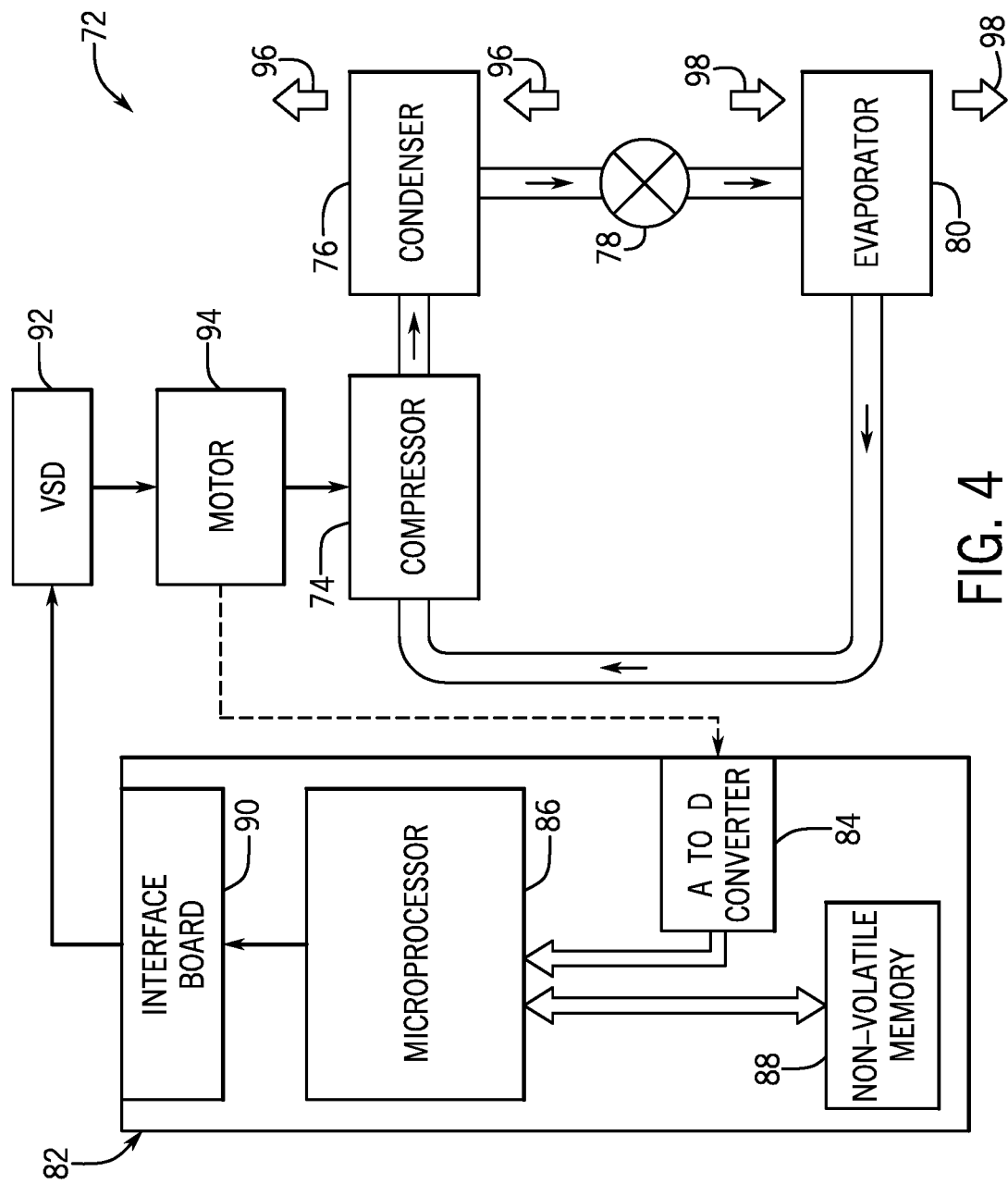
FIG. 4 is a schematic diagram of an embodiment of a vapor compression system that may be used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As noted above, certain HVAC systems may include an energy recovery wheel that is configured to transfer thermal energy and/or moisture between two air flows, such as a flow of fresh outdoor air entering the HVAC system and a flow of stale return air discharging from the HVAC system. The energy recovery wheel may be disposed upstream of certain heat exchange components of the HVAC system, such as an evaporator or a furnace, and may be used to pre-condition the outdoor air before the outdoor air flows across these components. Accordingly, the energy recovery wheel may improve an operational efficiency of the HVAC system by recovering energy from return air that is typically exhausted directly into an ambient environment. In conventional HVAC systems, removal of the energy recovery wheel from the HVAC system for cleaning and/or maintenance often involves significant disassembly of certain HVAC components that may be situated near the energy recovery wheel within the HVAC system enclosure. As a result, maintenance operations performed on the energy recovery wheel may be relatively time consuming and, in some cases, may render the HVAC system temporarily inoperable. Accordingly, embodiments of the present disclosure are directed toward an energy recovery wheel assembly that is configured to facilitate rapid removal of the energy recovery wheel from the HVAC system enclosure without involving disassembly of other HVAC components surrounding the energy recovery wheel assembly within the enclosure.

Figure 5:
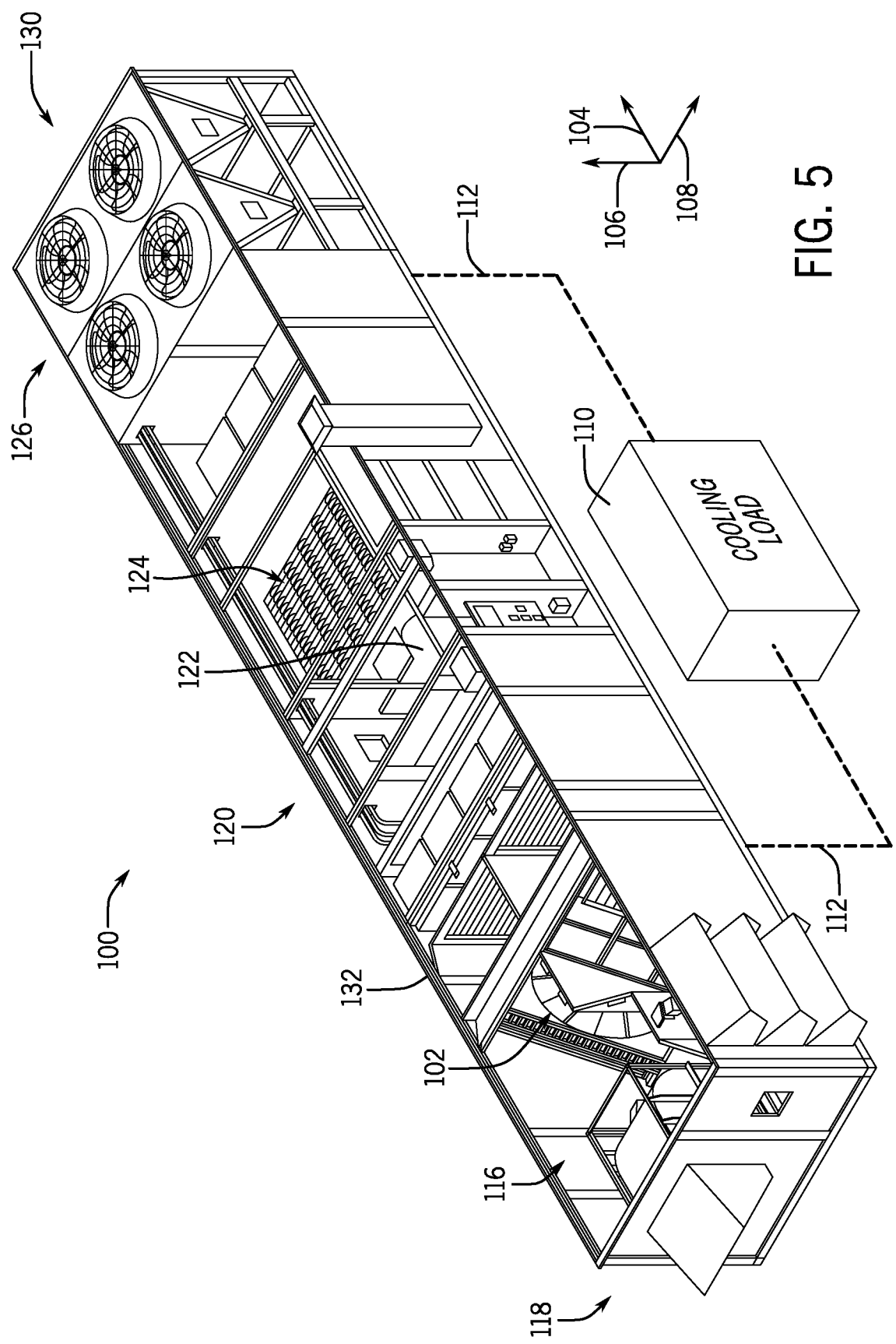
FIG. 5 is a perspective view of an embodiment of an HVAC system having an energy recovery wheel assembly, in accordance with an aspect of the present disclosure.

With the foregoing in mind, FIG. 5 is a perspective view of an embodiment of a heating, ventilation, and/or air conditioning (HVAC) system 100 having an energy recovery wheel (ERW) assembly 102. It should be noted that the HVAC system 100 may include embodiments or components of the HVAC unit 12 shown in FIG. 1, embodiments or components of the residential heating and cooling system 50 shown in FIG. 3, a rooftop unit (RTU), or any other suitable HVAC system. To facilitate discussion, the HVAC system 100, the ERW assembly 102, and their respective components, will be described with reference to a longitudinal axis 104, a vertical axis 106, which is oriented relative to gravity, and a lateral axis 108.

The HVAC system 100 may be configured to circulate a flow of conditioned air through a cooling load 110, such as a conditioned space within a building, residential home, or any other suitable structure. The cooling load 110 is in fluid communication with the HVAC system 100 via an air distribution system, represented by dashed lines 112, which includes ductwork configured to facilitate the supply and extraction of air from one or more rooms or spaces of the cooling load 110. The HVAC system 100 may also include a vapor compression system, such as the vapor compression system 72, which enables the HVAC system 100 to regulate one or more climate parameters within the cooling load 110. For example, the HVAC system 100 may be configured to maintain a desired air quality, air humidity, and/or air temperature within the cooling load 110.

As shown in the illustrated embodiment, the HVAC system 100 includes an intake/exhaust section 116, referred to herein as an air distribution plenum 116, which forms a first end portion 118 of the HVAC system 100. As discussed in detail below, the air distribution plenum 116 enables the HVAC system 100 to intake outdoor air from an ambient environment, such as the atmosphere, while also enabling the HVAC system 100 to discharge return air from the cooling load 110 to the ambient environment. The ERW assembly 102 may be disposed within the air distribution plenum 116 to facilitate recovery of thermal energy from the return air discharging from the cooling load 110. The illustrated HVAC system 100 includes a blower section 120 having one or more fans 122 configured to force air through the HVAC system 100 and also includes an evaporator section 124 situated downstream of the blower section 120, relative to a direction of air flow through the blower section 120. A condenser section 126 may form a second end portion 130 of the HVAC system 100, which is situated opposite the first end portion 118.

In some embodiments, the air distribution plenum 116, the ERW assembly 102, the blower section 120, and the evaporator section 124 may form a portion of and/or be situated within a central enclosure 132 of the HVAC system 100, which extends along the longitudinal axis 104. It should be noted that a portion of the enclosure 132 has been removed in the illustrated embodiment to shown components of the HVAC system 100 disposed within the enclosure 132, such as the ERW assembly 102. Further, it should be noted that in other embodiments, the HVAC system 100 may include any other suitable climate management components in addition to, or in lieu of, the components mentioned above.

Figure 6:
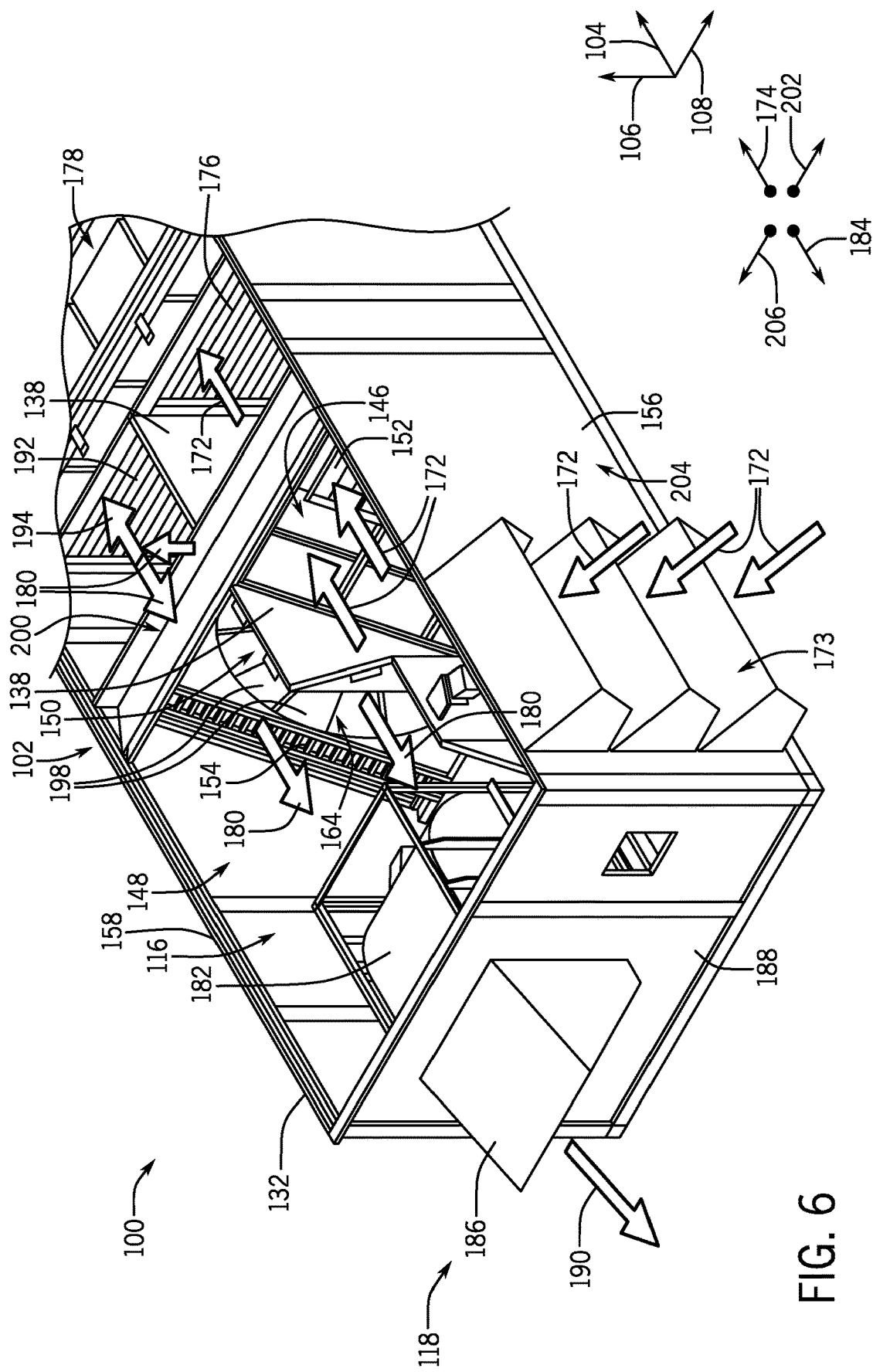
FIG. 6 is an expanded perspective view of an embodiment of the HVAC system of FIG. 5, in accordance with an aspect of the present disclosure.
Figure 10:
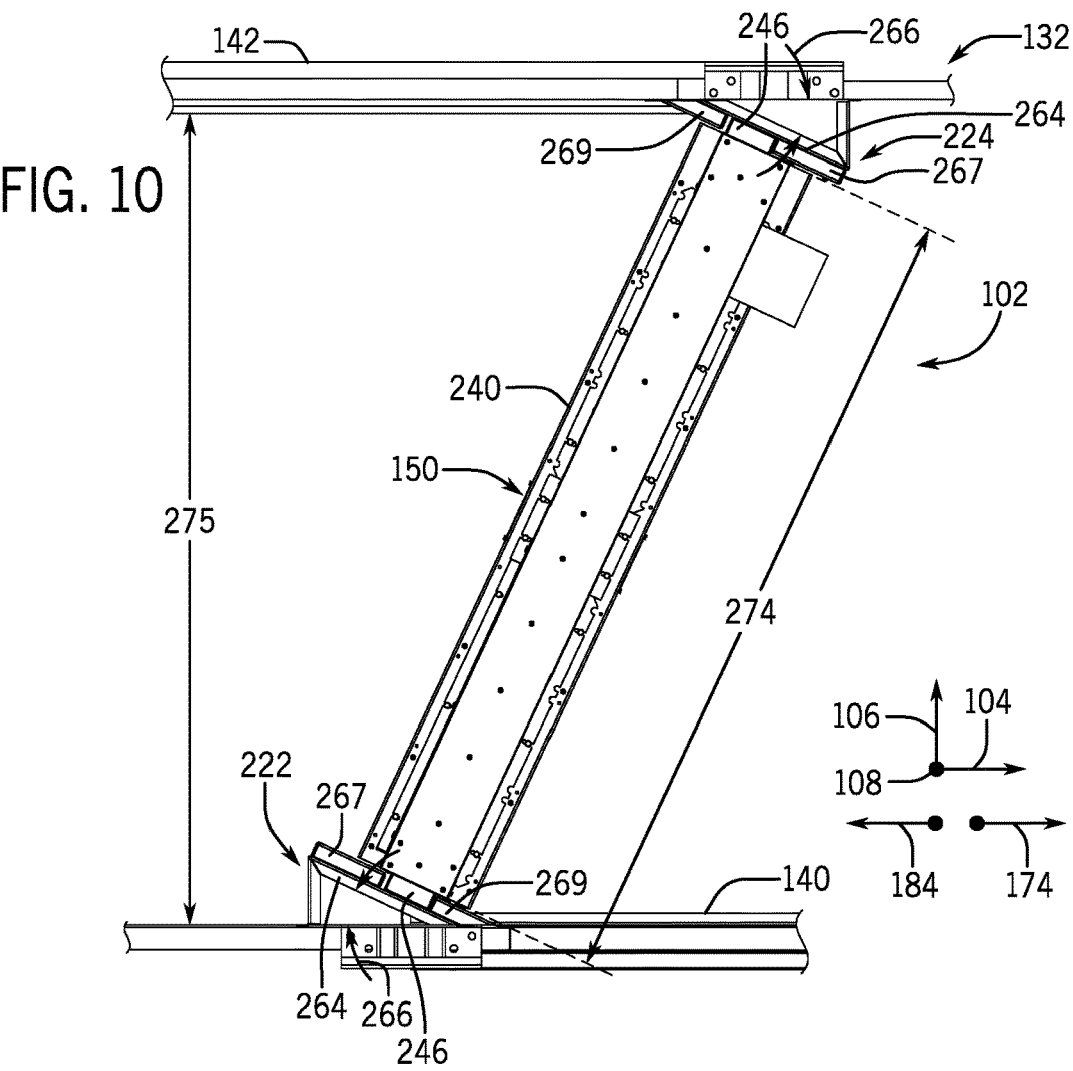
FIG. 10 is a side view of an embodiment of an energy recovery wheel assembly having the support rail of FIG. 9, in accordance with an aspect of the present disclosure.
Figure 22:
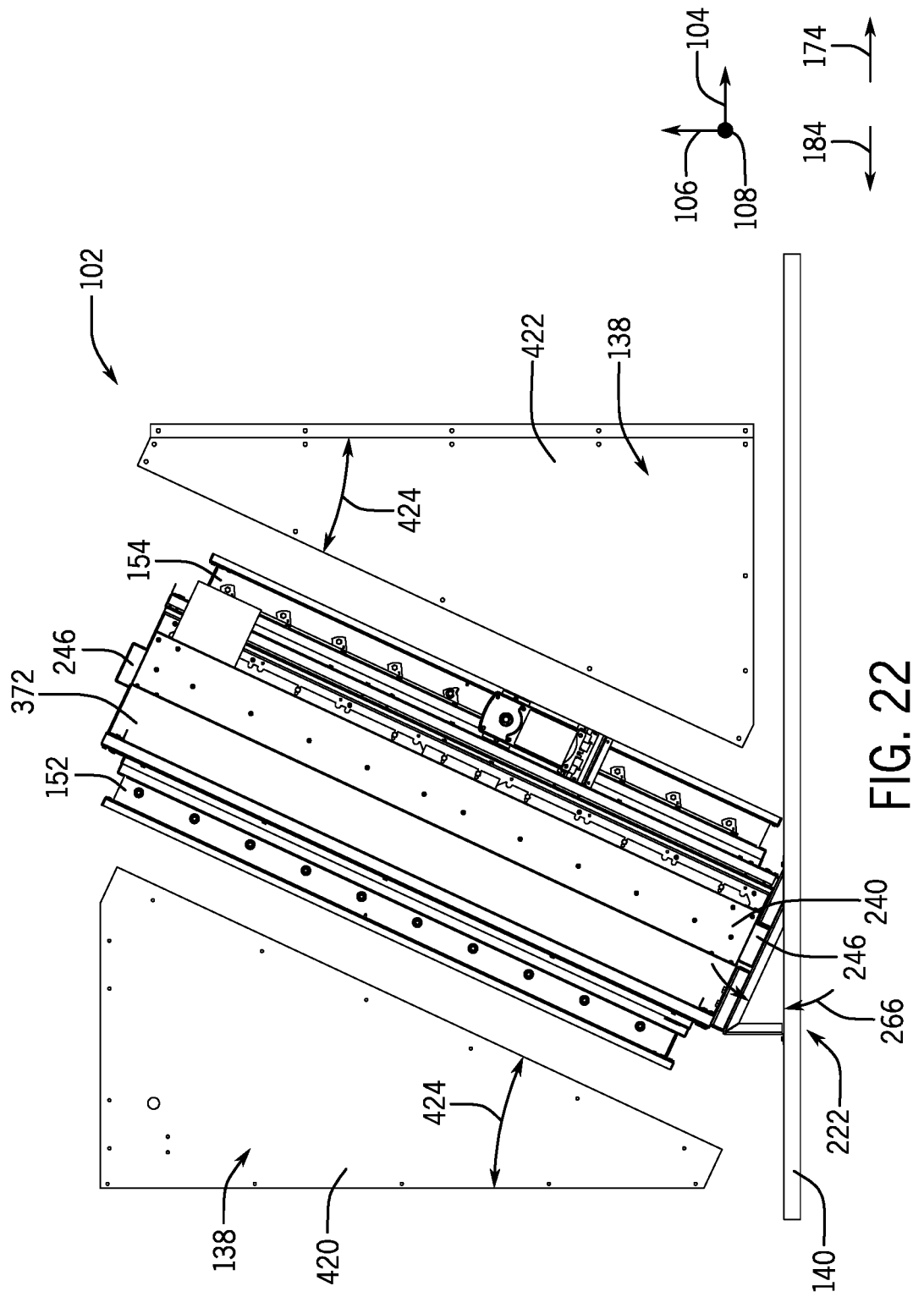
FIG. 22 is a side view of an embodiment of an energy recovery wheel assembly, in accordance with an aspect of the present disclosure.

FIG. 6 is an expanded perspective view of an embodiment of the air distribution plenum 116. As shown in the illustrated embodiment, the air distribution plenum 116 includes a partition 138 that extends generally along the vertical axis 106 between a first panel 140, as shown in FIG. 10, of the enclosure 132 and a second panel 142, as shown in FIG. 10, of the enclosure 132. The second panel 142 has been removed in the illustrated embodiment of FIG. 6 to show components of the HVAC system 100 disposed within the air distribution plenum 116, such as the partition 138 and the ERW assembly 102. The partition 138 may divide an interior of the air distribution plenum 116 to define an outdoor air flow path 146 and a return air flow path 148 through the air distribution plenum 116. In some embodiments, the partition 138 may extend substantially vertically, with respect to a direction of gravity, between the first panel 140 and the second panel 142. Accordingly, the outdoor air flow path 146 and the return air flow path 148 may extend horizontally, with respect to a direction of gravity, along the air distribution plenum 116, generally parallel to the longitudinal axis 104. The ERW assembly 102 may extend through an opening of the partition 138, as shown in FIG. 22, which enables an energy recovery wheel 150 of the ERW assembly 102 to span across at least a portion of the outdoor air flow path 146 and the return air flow path 148. As discussed in detail herein, this configuration may enable the energy recovery wheel 150 to transfer thermal energy and/or moisture between air flows respectively traversing the outdoor air flow path 146 and the return air flow path 148.

In the illustrated embodiment, the ERW assembly 102 includes an outdoor air bypass damper 152 and a return air bypass damper 154 that are disposed on opposing sides of the energy recovery wheel 150. Specifically, the outdoor air bypass damper 152 may extend between the energy recovery wheel 150 and a first side panel 156 of the enclosure 132, while the return air bypass damper 154 extends between the energy recovery wheel 150 and a second side panel 158 of the enclosure 132. Accordingly, the outdoor air bypass damper 152 and the return air bypass damper 154 are disposed within the outdoor air flow path 146 and the return air flow path 148, respectively. As discussed in detail below, this configuration may enable the outdoor air and return air bypass dampers 152, 154 to allow air traversing the outdoor air flow path 146 and/or the return air flow path 148 to bypass the energy recovery wheel 150 during certain operational periods of the HVAC system 100, such as periods where the energy recovery wheel 150 is inactive or non-operational.

Figure 8:
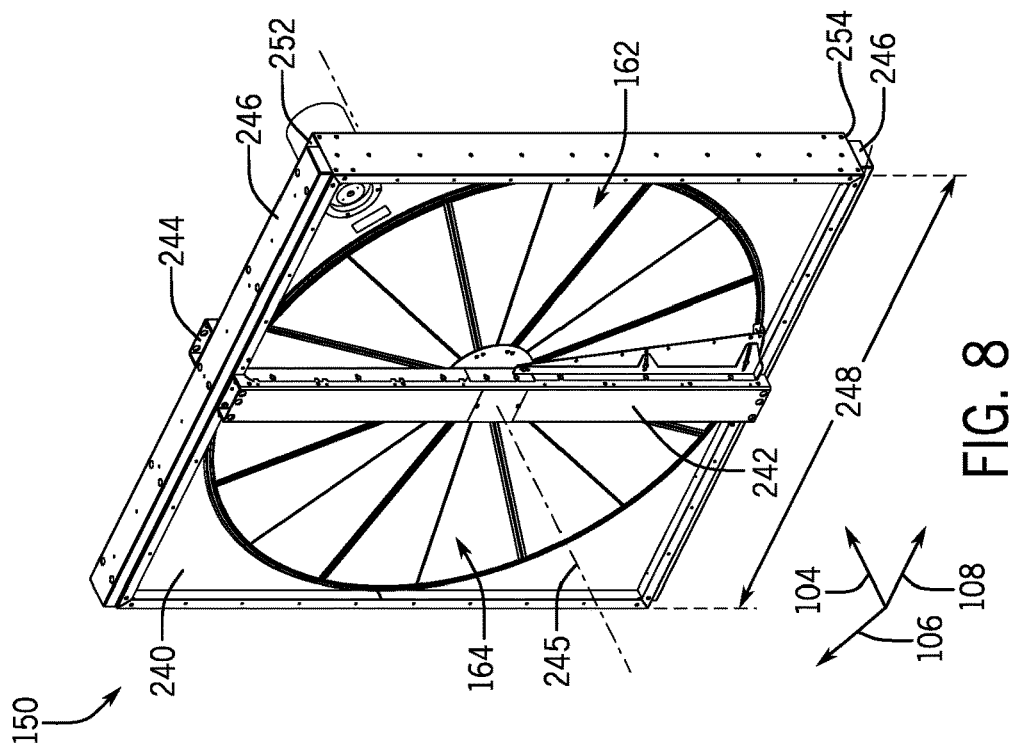
FIG. 8 is a perspective view of an embodiment of an energy recovery wheel, in accordance with an aspect of the present disclosure.

For clarity, it should be noted that a portion of the energy recovery wheel 150 that is disposed within the outdoor air flow path 146 will be referred to herein as a first portion 162, as shown in FIG. 8, of the energy recovery wheel 150, while a portion of the energy recovery wheel 150 that is disposed the return air flow path 148 will be referred to herein as a second portion 164 of the energy recovery wheel 150. It is important to note that, because the energy recovery wheel 150 may rotate during operation of the HVAC system 100, a particular section or segment of the energy recovery wheel 150 may continuously rotate into and out of the outdoor air flow path 146 and the return air flow path 148. Accordingly, as used herein, the first portion 162 of the energy recovery wheel 150 refers to the portion of the energy recovery wheel 150 that is actually disposed within the outdoor air flow path 146 at a particular instance in time, while the second portion 164 of the energy recovery wheel 150 is refers to the portion of the energy recovery wheel 150 that is disposed within the return air flow path 148 at that same instance in time. In other words, particular sections of the energy recovery wheel 150 that correspond to the first portion 162 and the second portion 164 may be transient while the energy recovery wheel 150 rotates relative to the outdoor air flow path 146 and the return air flow path 148.

The fans 122 of the blower section 120 may draw outdoor air 172 into the air distribution plenum 116 via an outdoor air inlet 173 and may direct the outdoor air 172 across the first portion 162 of the energy recovery wheel 150. Specifically, the fans 122 may direct the outdoor air 172 across the energy recovery wheel 150 in a first direction 174 that is generally parallel to the longitudinal axis 104. The outdoor air 172 may subsequently flow across an outdoor air damper 176 of the air distribution plenum 116 and enter a supply air plenum 178 that is in fluid communication with the evaporator section 124. Although the outdoor air inlet 173 is defined within or adjacent the first side panel 156 in the illustrated embodiment of FIG. 6, it should be noted that the outdoor air inlet 173 may be defined within any other suitable panel(s) of the enclosure 132 in other embodiments of the HVAC system 100.

The return air flow path 148 may receive a flow of return air 180 from the cooling load 110 via a return air inlet that may be defined within the first panel 140 of the enclosure 132. Specifically, the return air inlet may be defined within a section of the second panel 142 that is positioned upstream of the energy recovery wheel 150, with respect to a flow direction of the return air 180 across the energy recovery wheel 150. An exhaust blower 182 of the HVAC system 100 may facilitate drawing the return air 180 across the second portion 164 of the energy recovery wheel 150 in a second direction 184 that is generally opposite the first direction 174. The exhaust blower 182 may force the return air 180 through an exhaust air outlet 186 formed within an end panel 188 of the enclosure 132, thereby discharging the return air 180 from the air distribution plenum 116 as exhaust air 190.

In some cases, a portion of the return air 180 entering the air distribution plenum 116 may be recirculated through the cooling load 110. For example, the HVAC system 100 may include a recovery damper 192 that is operable to enable a portion of the return air 180 to flow in the first direction 174 and enter the supply air plenum 178. This portion of the return air 180, referred to herein as recovery air 194, may mix with the outdoor air 172 in the supply air plenum 178 to form supply air that the fans 122 direct in the first direction 174 toward the evaporator section 124 for further conditioning and eventual delivery to the cooling load 110. The recovery damper 192 may be configured regulate a flow rate of recovery air 194 recirculating back to the cooling load 110 by transitioning between an open position, a closed position, or any position therebetween.

As noted above, in embodiments where a relatively large temperature differential exits between the outdoor air 172 and the return air 180, the energy recovery wheel 150 may be operable to recover thermal energy from the return air 180 before the return air 180 discharges from the air distribution plenum 116. Particularly, the energy recovery wheel 150 may include a plurality of heat transfer elements 198 that facilitate the transfer thermal energy from the outdoor air 172 to the return air 180, or vice versa. The heat transfer elements 198 may be formed from a matrix material, a porous material, or any other suitable heat and/or moisture absorbing material. For example, in embodiments where the HVAC system 100 is operating in a cooling mode, a temperature of outdoor air 172 entering the air distribution plenum 116 may be relatively high, while a temperature of the previously-conditioned return air 180 is relatively low. Accordingly, relatively cool return air 180 flowing across heat transfer elements 198 of the second portion 164 of the energy recovery wheel 150 may absorb thermal energy from these heat transfer elements 198 and, thus, reduce a temperature of the heat transfer elements 198. Upon traversing the second portion 164 of the energy recovery wheel 150, the now heated return air 180 may exhaust from the HVAC system 100 via the exhaust air outlet 186.

As the energy recovery wheel 150 rotates within the enclosure 132, the cooled heat transfer elements 198 situated within the return air flow path 148 may transition into the outdoor air flow path 146. The heat transfer elements 198 entering the outdoor air flow path 146 may therefore absorb thermal energy from the warmer outdoor air 172 flowing thereacross. As such, the energy recovery wheel 150 may cool or pre-condition the outdoor air 172 by absorbing thermal energy from the outdoor air 172. That is, the energy recovery wheel 150 may pre-condition the outdoor air 172 by transferring thermal energy from the outdoor air 172 to the return air 180. It should be noted that the energy recovery wheel 150 may alternatively be used to transfer energy from the return air 180 to the outdoor air 172, for example, in embodiments where the HVAC system 100 is operating in a heating mode, rather than a cooling mode.

In any case, the heat transfer elements 198 may become congested with particulates over time, thereby causing the energy recovery wheel 150 to operate less effectively. As discussed in detail below, to facilitate cleaning and/or replacement of the heat transfer elements 198 or the energy recovery wheel 150 itself, the ERW assembly 102 includes a railing system 200 that enables rapid removal of the energy recovery wheel 150 from the air distribution plenum 116. More specifically, the railing system 200 enables translational movement of the energy recovery wheel 150 along the lateral axis 108, such that the energy recovery wheel 150 may be translated into or out of the enclosure 132 of the HVAC system 100. In this way, the energy recovery wheel 150 may be translated into or out of the enclosure 132 via a side of the enclosure 132 instead of, for example, via a top of the enclosure.

For example, a removable access cover 204 may be coupled to, or form a portion of, the first side panel 156 of the enclosure 132. Upon removal of the access cover 204, the energy recovery wheel 150 may be translated along the railing system 200 in a sliding direction 202, which extends generally perpendicular to the first direction 174 of air flow along the outdoor air flow path 146. In this manner, the energy recovery wheel 150 may be removed from the enclosure 132 for cleaning, maintenance, and/or inspection. As will be appreciated, lateral removal of the energy recovery wheel 150, as opposed to vertical removal in the vertical direction 106, may be accomplished without a crane or other overhead lifting device, thereby reducing the complexity of energy recovery wheel 150 maintenance. After maintenance of the energy recovery wheel 150 is completed, the energy recovery wheel 150 may be slid in a reverse sliding direction 206 to re-insert the energy recovery wheel 150 into the enclosure 132.

Figure 7:
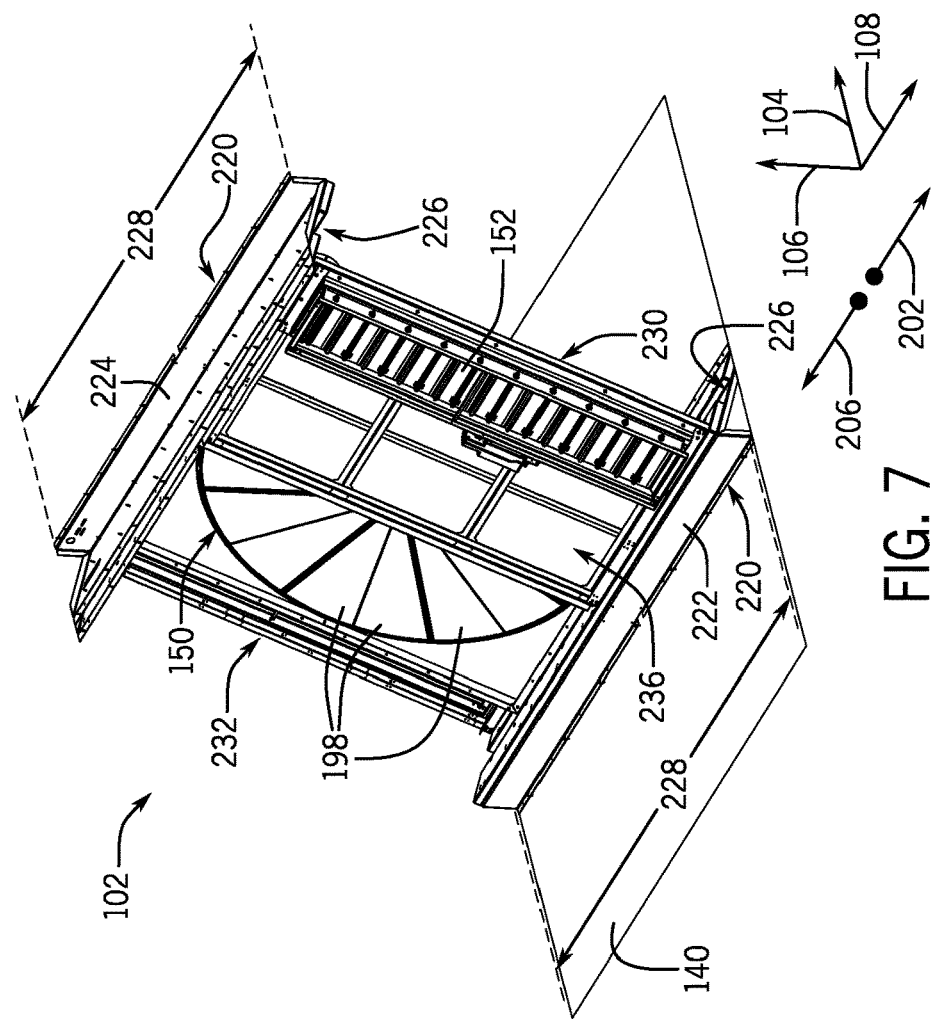
FIG. 7 is a perspective view of an embodiment of an energy recovery wheel assembly, in accordance with an aspect of the present disclosure.

To facilitate discussion of the ERW assembly 102 and its components, FIG. 7 is a perspective view of an embodiment of the ERW assembly 102. It should be noted that the following discussion with reference to FIG. 7 is intended to briefly introduce various components and subassemblies of the ERW assembly 102, which will be described in further detail with reference to FIGS. 8-24. With the foregoing in mind, FIG. 7 illustrates an embodiment of the railing system 200 that is configured to support the energy recovery wheel 150 within the enclosure 132 and enable translational or lateral movement of the energy recovery wheel 150 relative to the enclosure 132. As shown in the illustrated embodiment, the railing system 200 includes a first support rail 222 and a second support rail 224, which are disposed on opposing sides of the energy recovery wheel 150. The first support rail 222 may be coupled to the first panel 140 of the enclosure 132, while the second support rail 224 is coupled to the second panel 142 of the enclosure 132. The first and second support rails 222, 224 each include guide tracks 226 that extend along respective widths 228 of the first and second support rails 222, 224. As discussed with reference to FIG. 10 below, the guide tracks 226 may engage with the energy recovery wheel 150 to enable translational movement of the energy recovery wheel 150 along lateral axis 108, while movement of the energy recovery wheel 150 along the longitudinal axis 104 and the vertical axis 106 is substantially blocked, during installation and removal of the energy recovery wheel 150 from the enclosure 132.

Figure 17:
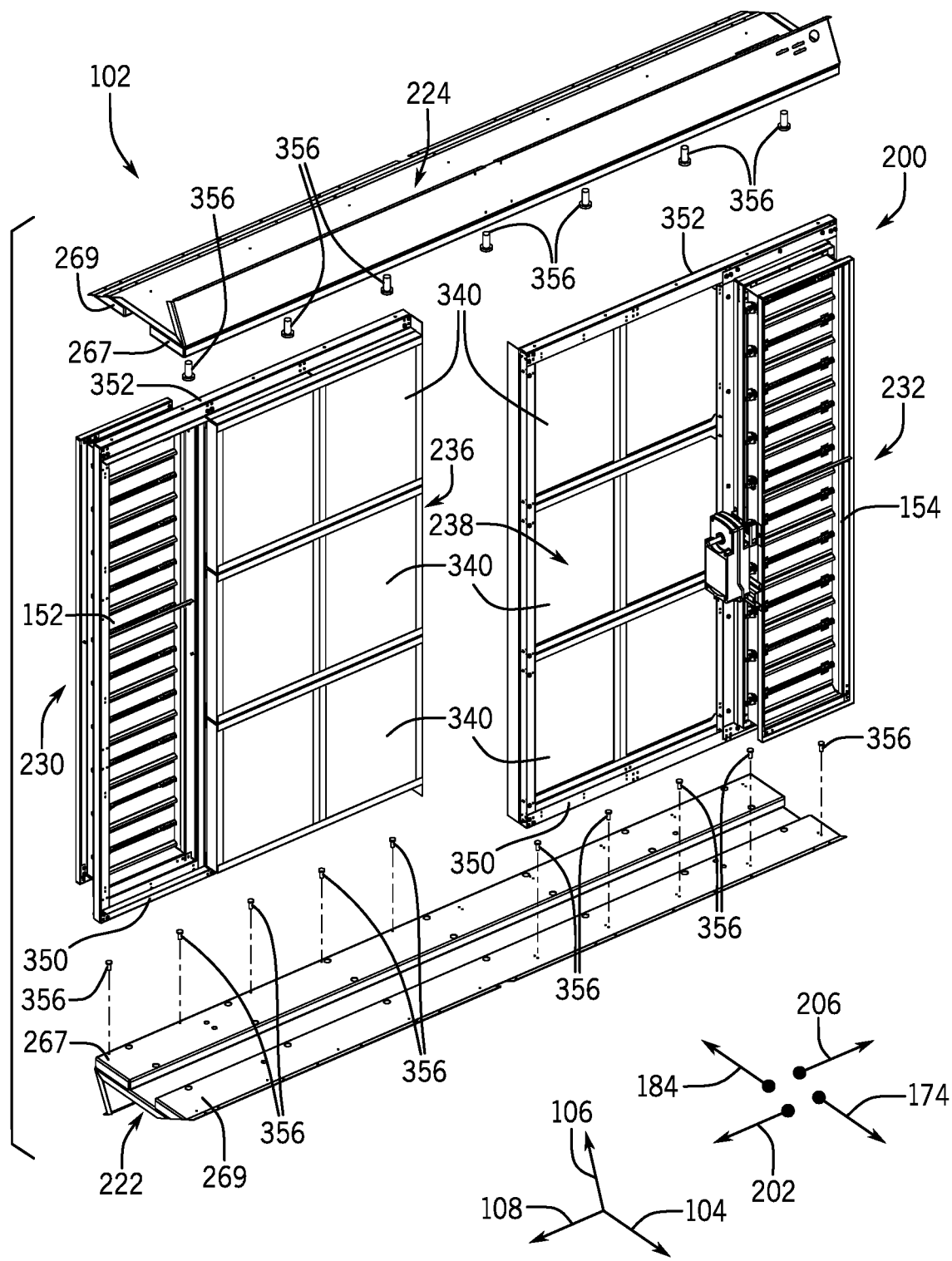
FIG. 17 is an exploded perspective view of an embodiment of an energy recovery wheel assembly, in accordance with an aspect of the present disclosure.

The ERW assembly 102 may further include a first subframe assembly 230 and a second subframe assembly 232 that respectively include the outdoor air bypass damper 152 and the return air bypass damper 154. The first and second subframe assemblies 230, 232 may extend between and couple to the first support rail 222 and the second support rail 224 of the railing system 200. In some embodiments, the first subframe assembly 230 and the second subframe assembly 232 include a first filter array 236 and a second filter array 238, respectively and as shown in FIG. 17, which are configured to block particulates, such as dust or pollen, from entering the energy recovery wheel 150 and potentially contaminating the heat transfer elements 198. For example, when the energy recovery wheel 150 is in an installed position within the enclosure 132, the first subframe assembly 230 may be disposed upstream of the first portion 162 of the energy recovery wheel 150, with respect to a flow direction of the outdoor air 172 across the first portion 162, such that the first filter array 236, also referred to herein as an outdoor air filter, may filter the outdoor air 172 before the outdoor air 172 flows across the energy recovery wheel 150. Similarly, the second subframe assembly 232 may be disposed upstream of the second portion 164 of the energy recovery wheel 150, with respect to a flow direction of the return air 180 across the second portion 164 thereby enabling the second filter array 238, also referred to herein as a return air filter, to filter the return air 180 before the return air 180 traverses the second portion 164.

As shown in the illustrated embodiment, the first support rail 222 and the second support rail 224 are offset from one another with respect the longitudinal axis 104. As discussed in detail below, this configuration may enable the railing system 200 to position the energy recovery wheel 150 in a slanted orientation within the enclosure 132, whereby the energy recovery wheel 150 is disposed at an oblique angle relative to the outdoor air flow path 146 and the return air flow path 148. In this way, embodiments of the energy recovery 150 may be that are larger than a vertical cross-sectional size of the enclosure 132 may be installed within the enclosure 132 without modifying dimensions, such as height, of the enclosure 132.

FIG. 8 is a perspective view of an embodiment of the energy recovery wheel 150. As shown in the illustrated embodiment, the energy recovery wheel 150 may be encompassed by a generally quadrilateral frame assembly 240. The energy recovery wheel 150 may be rotatably coupled to the frame assembly 240 via a shaft extending between a first support rib 242 and a second support rib 244 of the frame assembly 240. Accordingly, the energy recovery wheel 150 may rotate about a centerline 245 of a passage that extends through the frame assembly 240. It should be noted that a radial gap between the energy recovery wheel 150 and the frame assembly 240 is relatively small, such that air flow between the energy recovery wheel 150 and the frame assembly 240 is substantially negligible.

The railing system 200 may include a pair of guide extensions 246 that are coupled to opposing end portions of the frame assembly 240. Although the guide extensions 246 are shown as extending along an entire width 248 of the frame assembly 240, it should be noted that, in other embodiments, one or both of the guide extensions 246 may extend along a portion of the width 248 instead of the entire width 248. In addition, each of the guide extensions 246 may be formed of multiple individual extensions or segments, rather than a single extension that is coupled to the frame assembly 240. For example, the guide extensions 246 may each include two or more separate extensions that are coupled to a top surface 252 or a bottom surface 254 of the frame assembly 240. In yet further embodiments, one or more of the guide extensions 246 may be formed integrally with the frame assembly 240.

Figure 9:
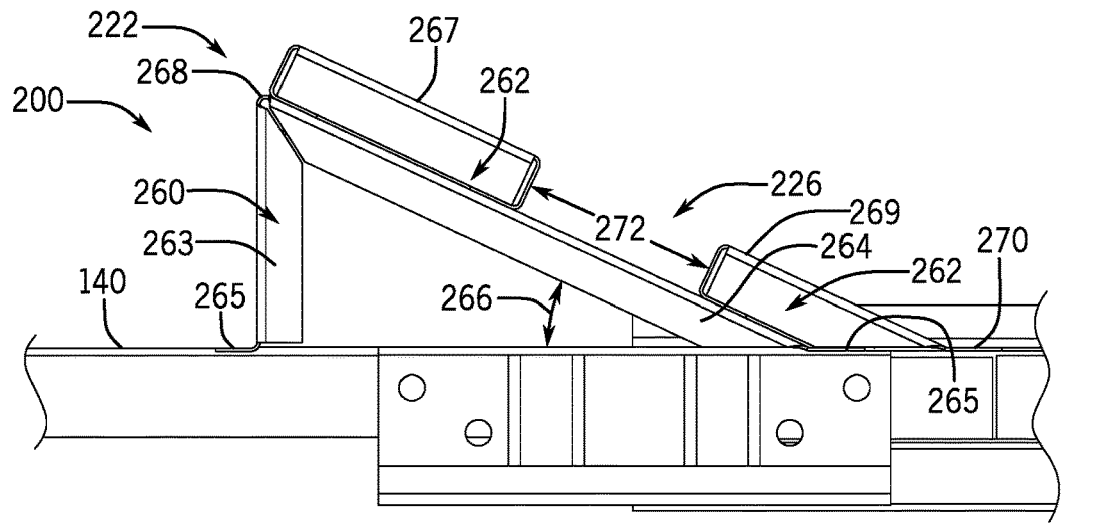
FIG. 9 is a side view of an embodiment of a support rail for an energy recovery wheel assembly, in accordance with an aspect of the present disclosure.

FIG. 9 is a side view of an embodiment of the first support rail 222. It should be noted that, in some embodiments, the second support rail 224 may be substantially similar to the first support rail 222. That is, the second support rail 224 may include some or all of the components of the first support rail 222 discussed herein and may be used interchangeably with the first support rail 222. Accordingly, reference numerals associated with certain components of the first support rail 222 may be used to identify self-similar components of the second support rail 224 in later discussion. However, for conciseness, only the first support rail 222 will be described with reference to FIG. 9.

As shown in the illustrated embodiment, the first support rail 222 includes a base member 260 having a pair of guide members 262 coupled thereto. In certain embodiments, the base member 260 may include a single piece component that is formed from a continuous piece of material. For example, the base member 260 may be formed of sheet metal that is bent or deformed into the illustrated shape of the base member 260. In any case, the base member 260 may include a leg portion 263 and an inclined portion 264 extending therefrom. The leg portion 263 and the inclined portion 264 may each include respective flanges 265 that facilitate coupling the base member 260 to the first panel 140 via suitable fasteners, such as bolts, rivets, and/or friction pins, or adhesives, such as bonding glue, metallurgical processes such as welds or brazing, or any outer suitable adhesive. As shown in the illustrated embodiment, the leg portion 263 may extends generally along the vertical axis 106 while the inclined portion 264 extends at an angle 266 relative to the first panel 140 and the longitudinal axis 104. A magnitude of the angle 266 may be altered by adjusting length dimensions of the leg portion 263 and/or the inclined portion 264. As an example, in some embodiments, the angle 266 may be between about 10 degrees and about 60 degrees, between about 20 degrees and about 50 degrees, or about 45 degrees. However, in other embodiments, the angle 266 may be less than 10 degrees or greater than 50 degrees. In any case, as discussed in detail below, the angle 266 of the inclined portion 264 may facilitate positioning the energy recovery wheel 150 in the slanted orientation within the enclosure 132.

The guide members 262 may include a head member 267, which is disposed near an apex 268 of the base member 260, and a tail member 269, which is disposed near a distal portion of the inclined portion 264. In some embodiments, the tail member 269 may include a flange 270 in addition to, or in lieu of, the flange 265 of the inclined portion 264, which facilitates coupling the first support rail 222 to the first panel 140. In any case, the head member 267 and the tail member 269 may be spaced apart from one another to form a gap 272 that defines the guide track 226 of the first support rail 222. In certain embodiments, a width of the gap 272 may be substantially equal to a width of the guide extensions 246, thereby mitigating movement and/or vibration of the energy recovery wheel 150 in directions other the sliding direction 202 and the reverse sliding direction 206.

FIG. 10 is a side view of an embodiment of the railing system 200 and the energy recovery wheel 150. As noted above, in some embodiments, the first support rail 222 and the second support rail 224 may be self-similar components. For example, the second support rail 224 may be a duplicate of the first support rail 222 that is rotated 180 degrees about the lateral axis 108 and is coupled to the second panel 142 of the enclosure 132. However, in other embodiments, the first and second support rails 222, 224 may each include unique components or features.

As shown in the illustrated embodiment, the first and second support rails 222, 224 cooperate to position the energy recovery wheel 150 at the angle 266 relative to the first panel 140 and the second panel 142 of the enclosure 132. In particular, the first and second support rails 222 may slant the energy recovery wheel 150 in the first direction 174, such that the energy recovery wheel 150 is situated within the outdoor air flow path 146 at an obtuse angle relative to a flow direction of the outdoor air 172 along the outdoor air flow path 146. Conversely, the energy recovery wheel 150 is disposed within the return air flow path 148 at an acute angle relative to a flow direction of the return air 180 along the return air flow path 148. However, it should be noted that in other embodiments, the first and second support rails 222, 224 may be configured to slant the energy recovery wheel 150 in the second direction 184, rather than the first direction 174.

In any case, railing system 200 positions the energy recovery wheel 150 at an oblique angle with respect to the outdoor air flow path 146 and the return air flow path 148 of the enclosure 132. In this manner, a height 274 of the frame assembly 240, a diameter of the energy recovery wheel 150, or both, may exceed an interior height 275 of the enclosure 132. Accordingly, the railing system 200 facilitates positioning of an oversized energy recovery wheel 150 within the enclosure 132 without involving the inclusion of aesthetically unappealing protrusions or enclosure 132 modifications at section of the enclosure 132 having the energy recovery wheel 150 and/or involving an increase in the interior height 275 of the enclosure 132. A relatively large energy recovery wheel 150 may transfer thermal energy and/or moisture between the outdoor air 172 and the return air 180 at an enhanced rate and may thus improve an operational efficiency of the HVAC system 100 by recovering more energy from the return air 180 before the return air 180 discharges from the enclosure 132.

Gravity may cause the energy recovery wheel 150 to slide along the inclined portions 264 of the first and second support rails 222, 224 until the guide extensions 246 respectively abut the tail member 269 of the first support rail 222 and the head member 267 of the second support rail 224. Accordingly, in certain embodiments, the head member 267 of the first support rail 222 and the tail member 269 of the second support rail 224 may be omitted from the railing system 200, thereby reducing manufacturing costs of the first and second support rails 222, 224.

Figure 11:
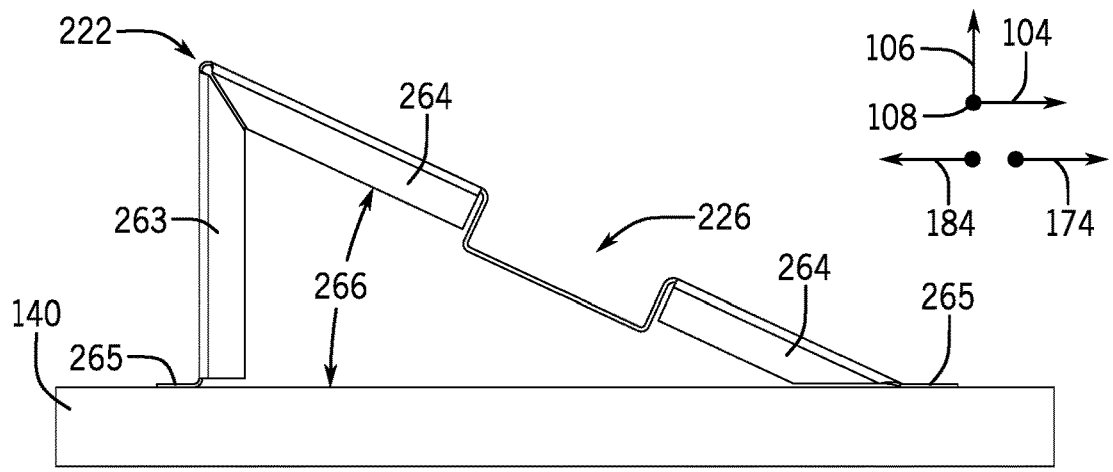
FIG. 11 is a side view of an embodiment of a support rail for an energy recovery wheel assembly, in accordance with an aspect of the present disclosure.
Figure 12:
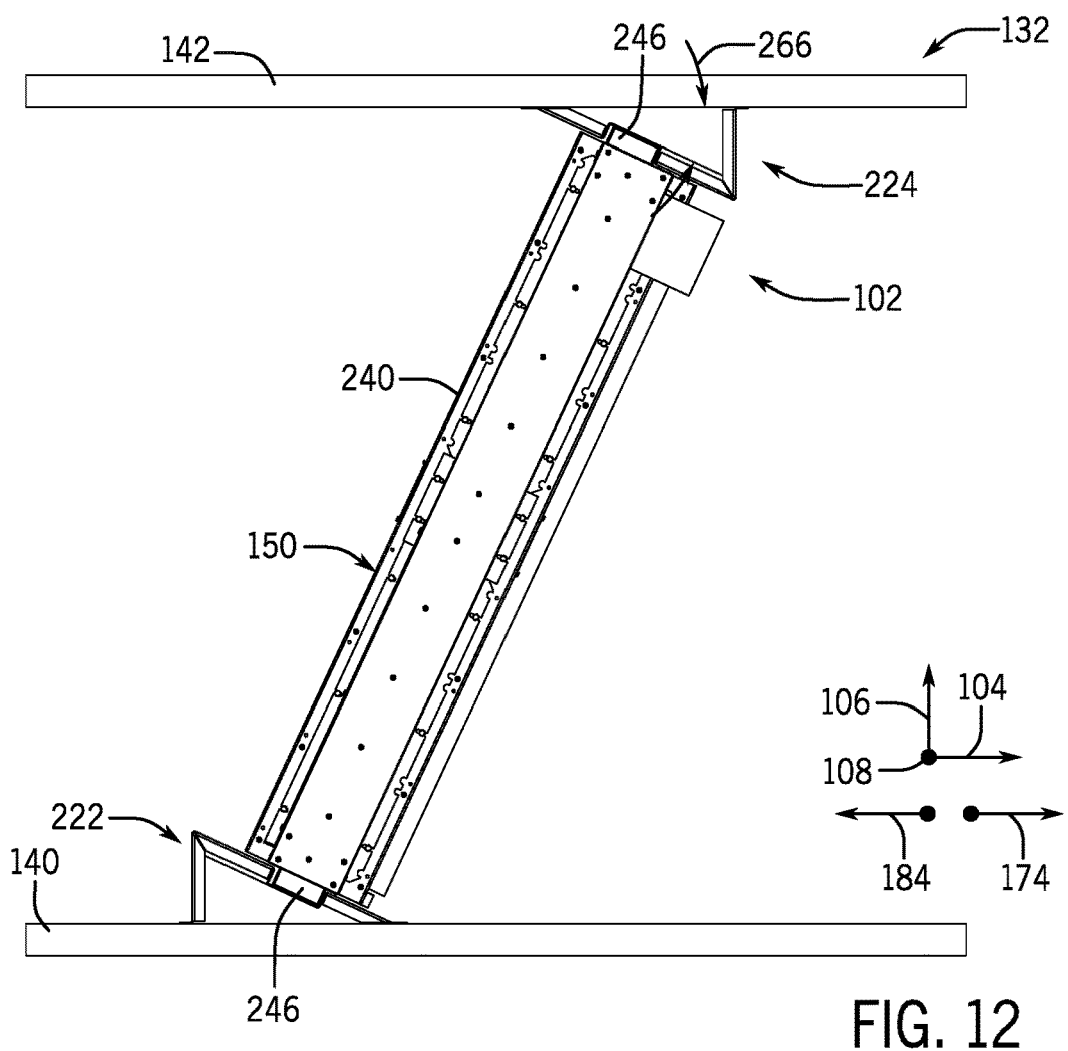
FIG. 12 is a side view of an embodiment of an energy recovery wheel assembly having the support rail of FIG. 11, in accordance with an aspect of the present disclosure.

FIG. 11 is a side view of another embodiment of the first support rail 222, in which the first support rail 222 is formed from or as a single piece component. For example, the first support rail 222 may be formed from a single piece of sheet metal or other material that is bent to form leg portion 263, the inclined portion 264, the flanges 265, and the guide track 226 of the first support rail 222. To further illustrate, FIG. 12 is a side view of an embodiment of the railing system 200 supporting the energy recovery wheel 150 in an installed configuration, where both the first support rail 222 and the second support rail 224 are single piece components formed in accordance with the techniques discussed with reference to FIG. 11.

Figure 13:
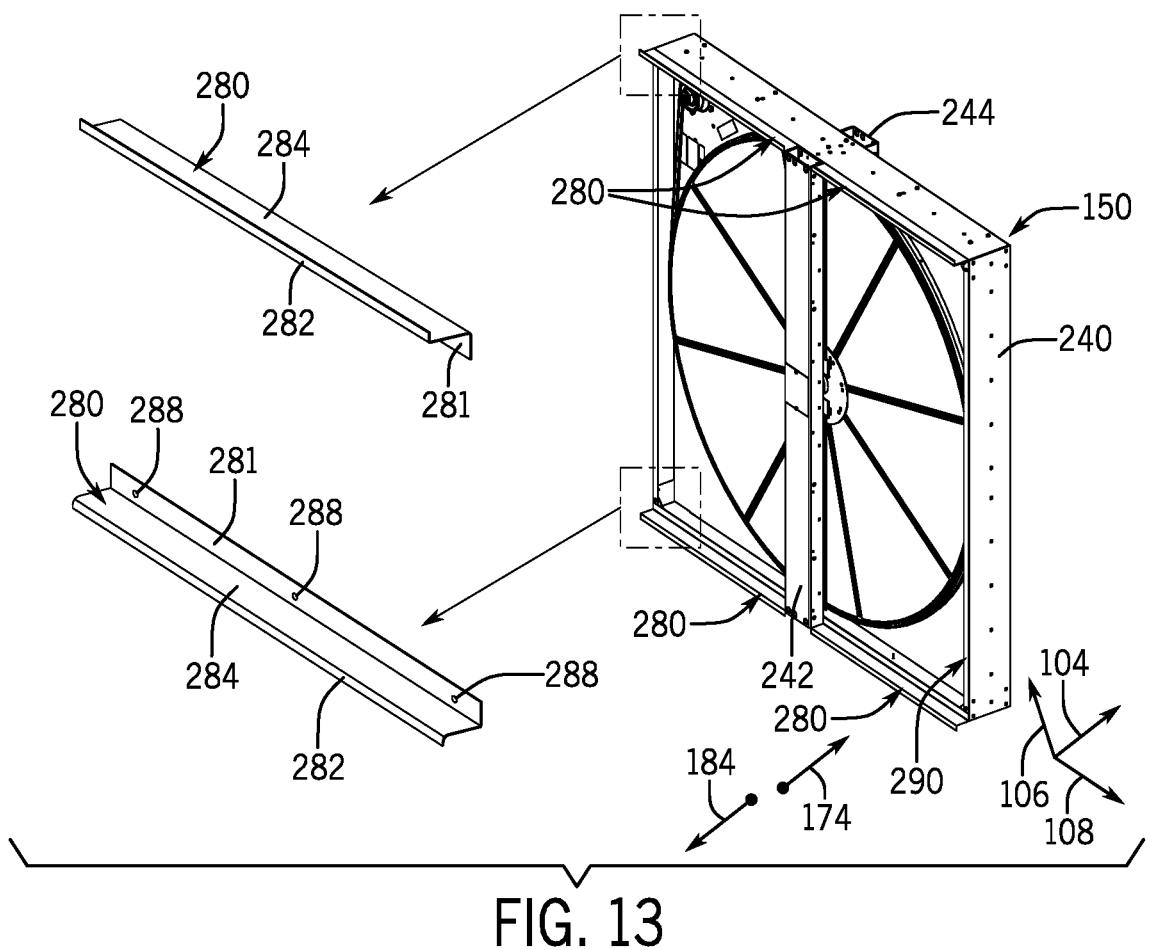
FIG. 13 is a perspective view of an embodiment of an energy recovery wheel, in accordance with an aspect of the present disclosure.
Figure 14:
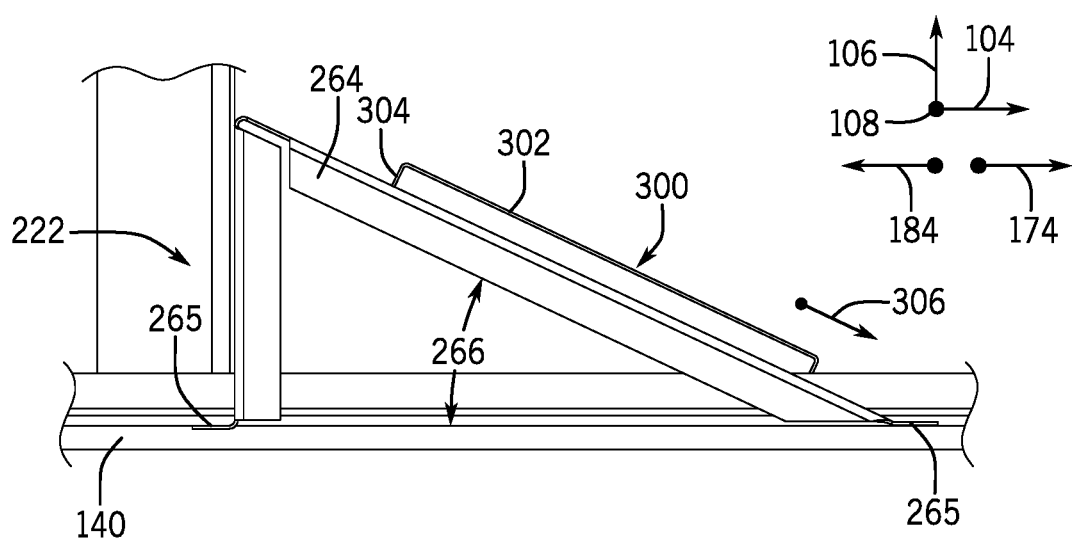
FIG. 14 is a side view of an embodiment of a support rail for an energy recovery wheel assembly, in accordance with an aspect of the present disclosure.
Figure 15:
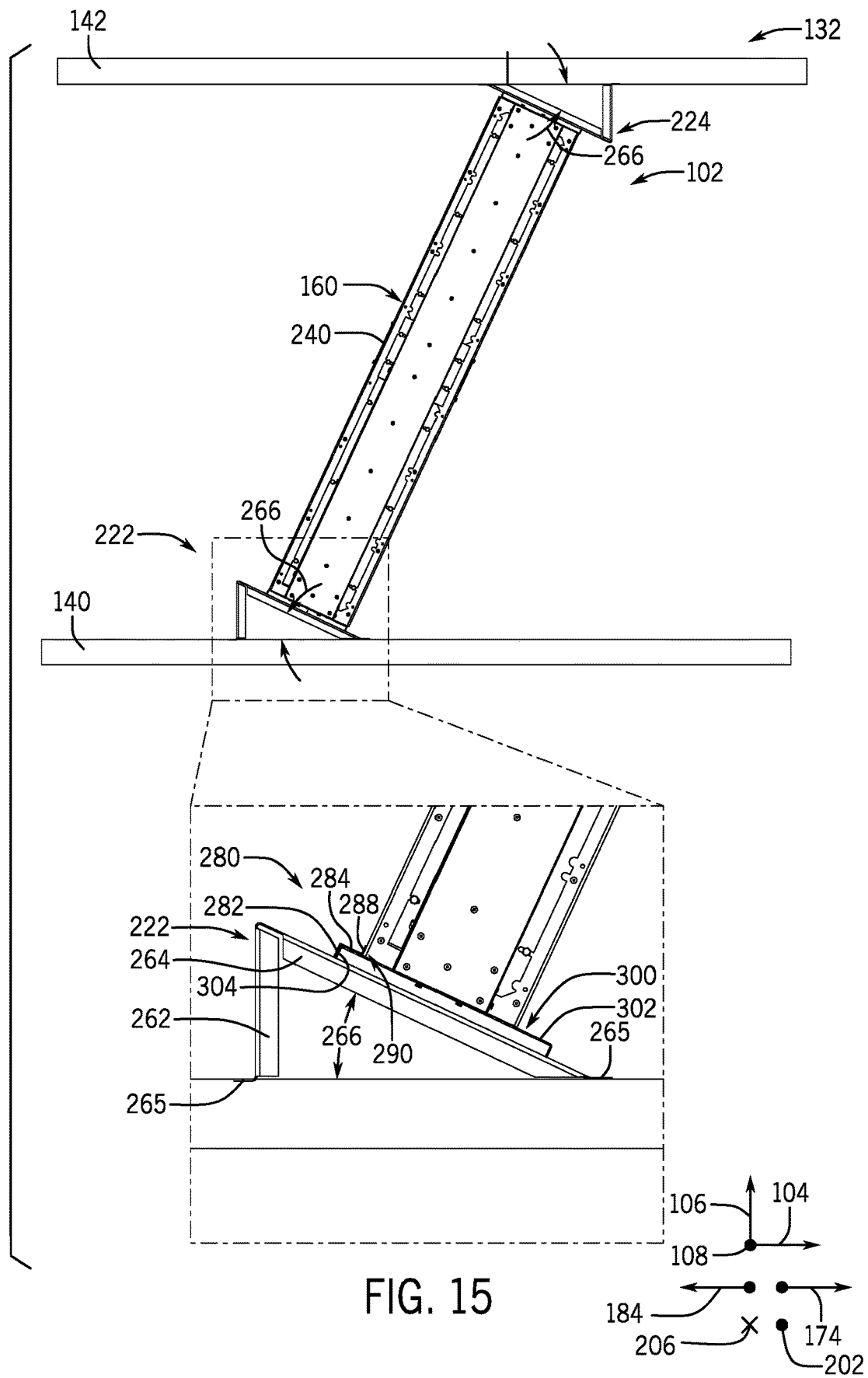
FIG. 15 is a side view of an embodiment of an energy recovery wheel assembly having the support rail of FIG. 14, in accordance with an aspect of the present disclosure.

FIGS. 13-15 illustrate another embodiment of the energy recovery wheel 150 and the railing system 200. In the illustrated embodiment of FIG. 13, the railing system 200 includes a plurality of guide hooks 280 in place of the guide extensions 246 discussed above. The guide hooks 280 are coupled to the frame assembly 240 of the energy recovery wheel 150. The guide hooks 280 may each include a fastening flange 281 and an engagement lip 282, which extend generally orthogonally from opposing edges of a central body 284. The fastening flanges 281 may facilitate coupling of the guide hooks 280 to the frame assembly 240 of the energy recovery wheel 150. For example, the fastening flanges 281 may include mounting apertures 288 that enable suitable fasteners to couple the guide hooks 280 to an end face 290 of the fame assembly 240.

FIG. 14 is a side view of an embodiment of the first support rail 222 that is configured to engage with the guide hooks 280 of FIG. 13. As shown in the illustrated embodiment, the first support rail 222 may include a protrusion member 300 that includes a support surface 302 configured to support the frame assembly 240 of the energy recovery wheel 150. The protrusion member 300 also includes a mating lip 304 that is configured to engage with the engagement lip 282 of one of the guide hooks 280 to block translational movement of the energy recovery wheel 150 in a direction 306 along the support surface 302. For sake of example, FIG. 15 is side view of an embodiment of the railing system 200 equipped with the guide hooks 280 and protrusion members 300. As shown in the illustrated embodiment, the second support rail 224 is substantially similar to the first support rail 222 and is coupled to the second panel 142 in an inverted position, as compared to the first support rail 224. Accordingly, the guide hooks 280 may engage with the respective protrusion members 300 of the first and second support rails 222, 224 and thereby block movement of the energy recovery wheel 150 in the direction 306 while enabling translational movement along the sliding direction 202 or the reverse sliding direction 206.

Figure 16:
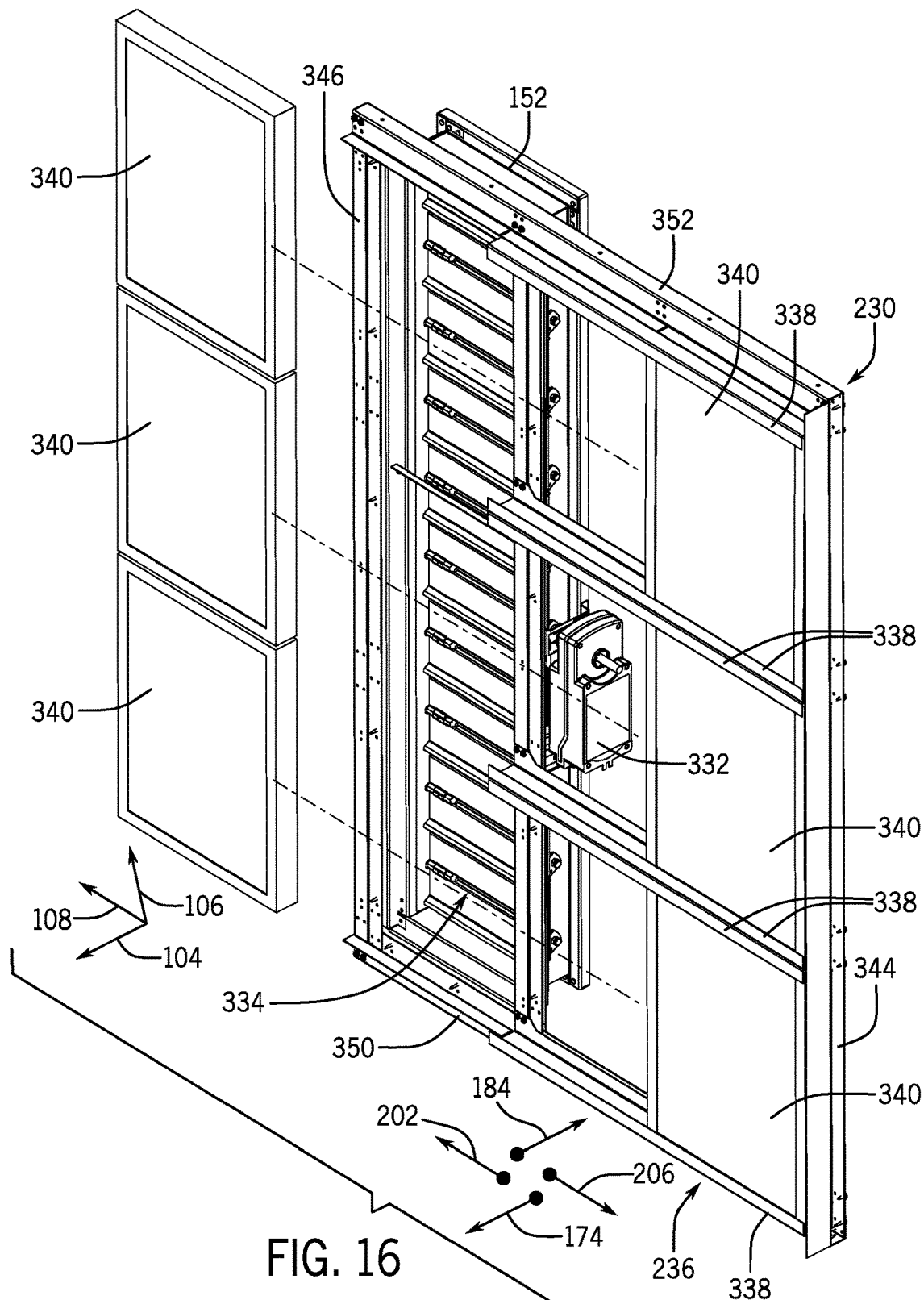
FIG. 16 is a perspective view of an embodiment of a subframe assembly of an energy recovery wheel assembly, in accordance with an aspect of the present disclosure.

FIG. 16 is a perspective view of an embodiment of the first subframe assembly 230 of the ERW assembly 102. Similarly to the first and second support rails 222, 224 discussed above, it should be noted that, in some embodiments, the first subframe assembly 230 may be substantially similar to the second subframe assembly 232. That is, the second subframe assembly 232 may include some or all of the components of the first subframe assembly 230 discussed herein and may be used interchangeably with the first subframe assembly 230. Accordingly, reference numerals associated with certain components of the first subframe assembly 230 may be used to identify self-similar components of the second subframe assembly 232 in later discussion. However, for conciseness, only the first subframe assembly 230 will be described with reference to FIG. 16.

As previously discussed above, the first subframe assembly 230 may include the outdoor air bypass damper 152 and the first filter array 236, which are disposed adjacent one another along the lateral axis 108. The outdoor air bypass damper 152 may include an actuator 332, which is configured to transition louvers 334 of the outdoor air bypass damper 152 between closed positions, in which air flow through the outdoor air bypass damper 152 is substantially blocked, and open positions, in which air flow through the outdoor air bypass damper 152 is substantially unrestricted.

The first filter array 236 may include a plurality of filter guide rails 338 that is coupled to the first subframe assembly 230 and is configured to receive filter elements 340. The filter guide rails 338 may be configured to facilitate rapid replacement of the filter elements 340 without involving disassembly of the first subframe assembly 230. For example, to remove the filter elements 340 from the first subframe assembly 230 for cleaning or replacement, the filter elements 340 may be translated along the filter guide rails 338 in the sliding direction 202 until the filter elements 340 are released from the filter guide rails 338. To insert new or cleaned filter elements 340 into the first subframe assembly 230, the filter elements 340 may be inserted between respective ones of the filter guide rails 338 and translated in the reverse sliding direction 206 until the filter elements 340 abut an inner rail 344 of the first subframe assembly 230 or another filter element 340.

The first subframe assembly 230 also includes an outer rail 346 that extends between a first mounting rail 350 and a second mounting rail 352 of the first subframe assembly 230. The first and second mounting rails 350, 352 may include fastener apertures defined therein, which enable coupling of the first subframe assembly 230 to the first and second support rails 222, 224 of the railing system 200 via fasteners. For example, FIG. 17 is an exploded perspective view of an embodiment of the ERW assembly 102 that illustrates a mounting configuration of the first subframe assembly 230 and the second subframe assembly 232. As shown in the illustrated embodiment, fasteners 356, such as screws, friction pins, or the like, may be used to couple the first and second mounting rails 350, 352 of the first subframe assembly 230 to the head member 267 of the first support rail 222 and to the tail member 269 of the second support rail 224, respectively. Similarly, fasteners 356 may be used to couple the first and second mounting rails 350, 352 of the second subframe assembly 232 to the tail member 269 of the first support rail 222 and the head member 267 of the second support rail 224, respectively. As a result, the first and second subframe assemblies 230, 232 may extend between and rigidly couple to the first support rail 222 and the second support rail 224.

Figure 18:
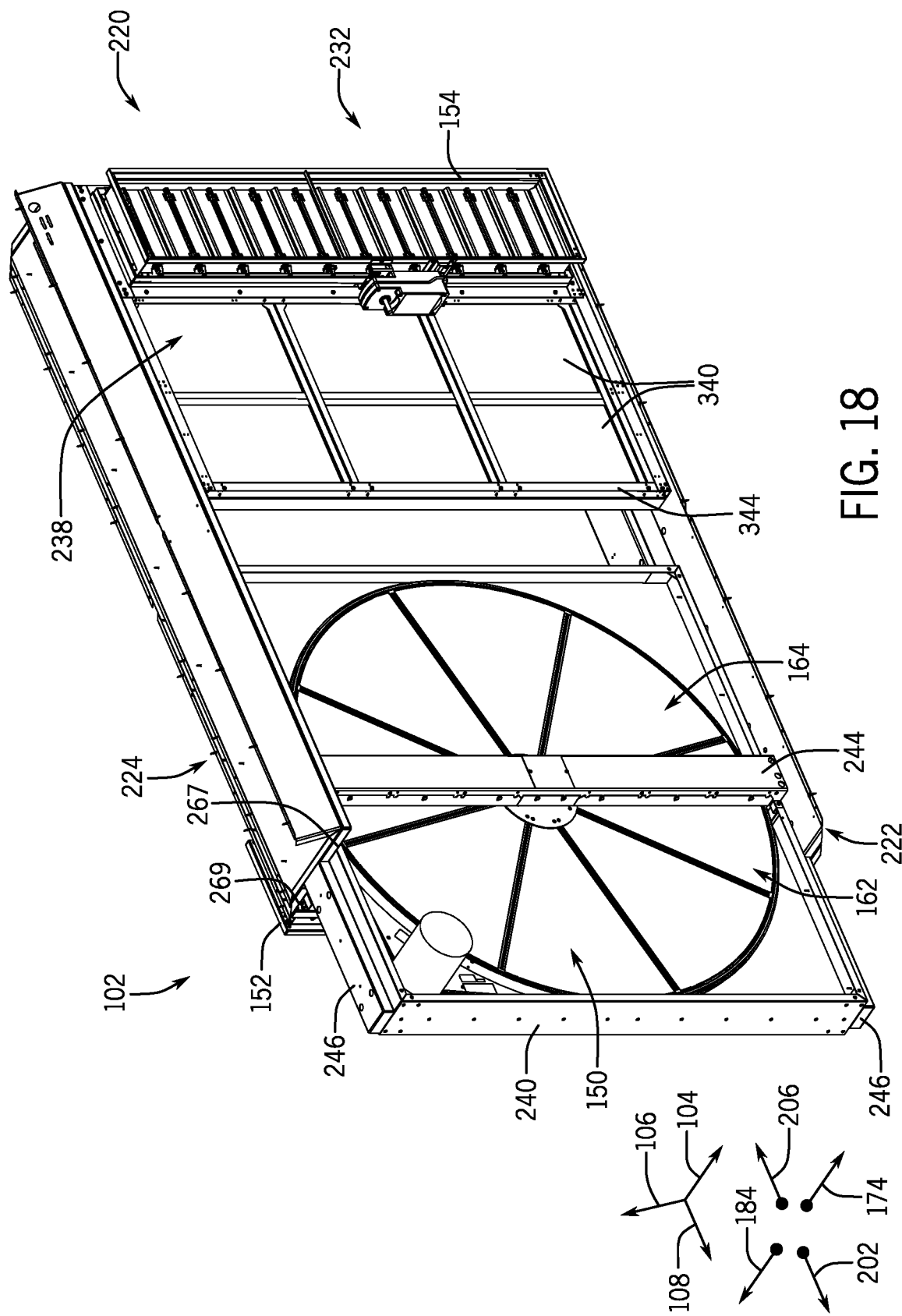
FIG. 18 is a perspective view of an embodiment of an energy recovery wheel assembly having an energy recovery wheel in a partially extracted position, in accordance with an aspect of the present disclosure.

FIG. 18 is a perspective view of an embodiment of the ERW assembly 102 having the energy recovery wheel 150 in a partially extracted or removed position. As shown in the illustrated embodiment, the railing system 200 enables the energy recovery wheel 150 to translate along the lateral axis 108 relative to the first and second subframe assemblies 230, 232. Accordingly, to transition to the energy recovery wheel 150 toward an extracted position, the energy recovery wheel 150 may be translated along the railing system 200 in the sliding direction 202 until the energy recovery wheel 150 is removed or substantially removed from the remaining portion of the ERW assembly 102 and the enclosure 132. To transition the energy recovery wheel 150 to a centered, assembled, and/or installed position, the energy recovery wheel 150 may be translate in the reverse sliding direction 206 until the energy recovery wheel 150 is substantially centered within the ERW assembly 102 and/or the enclosure 132. More specifically, the energy recovery wheel 150 may be translated along the reverse sliding direction 206 until the second support rib 244 is disposed substantially adjacent to the inner rail 344 of the second subframe assembly 232, and the first support rib 242 is disposed substantially adjacent the inner rail 344 of the first subframe assembly 230. In some embodiments, a service technician may manually translate the energy recovery wheel 150 between the extracted and centered positions. In other embodiments, the ERW assembly 102 may include an actuator that is configured to translate the energy recovery wheel 150 along the railing system 200.

Figure 19:
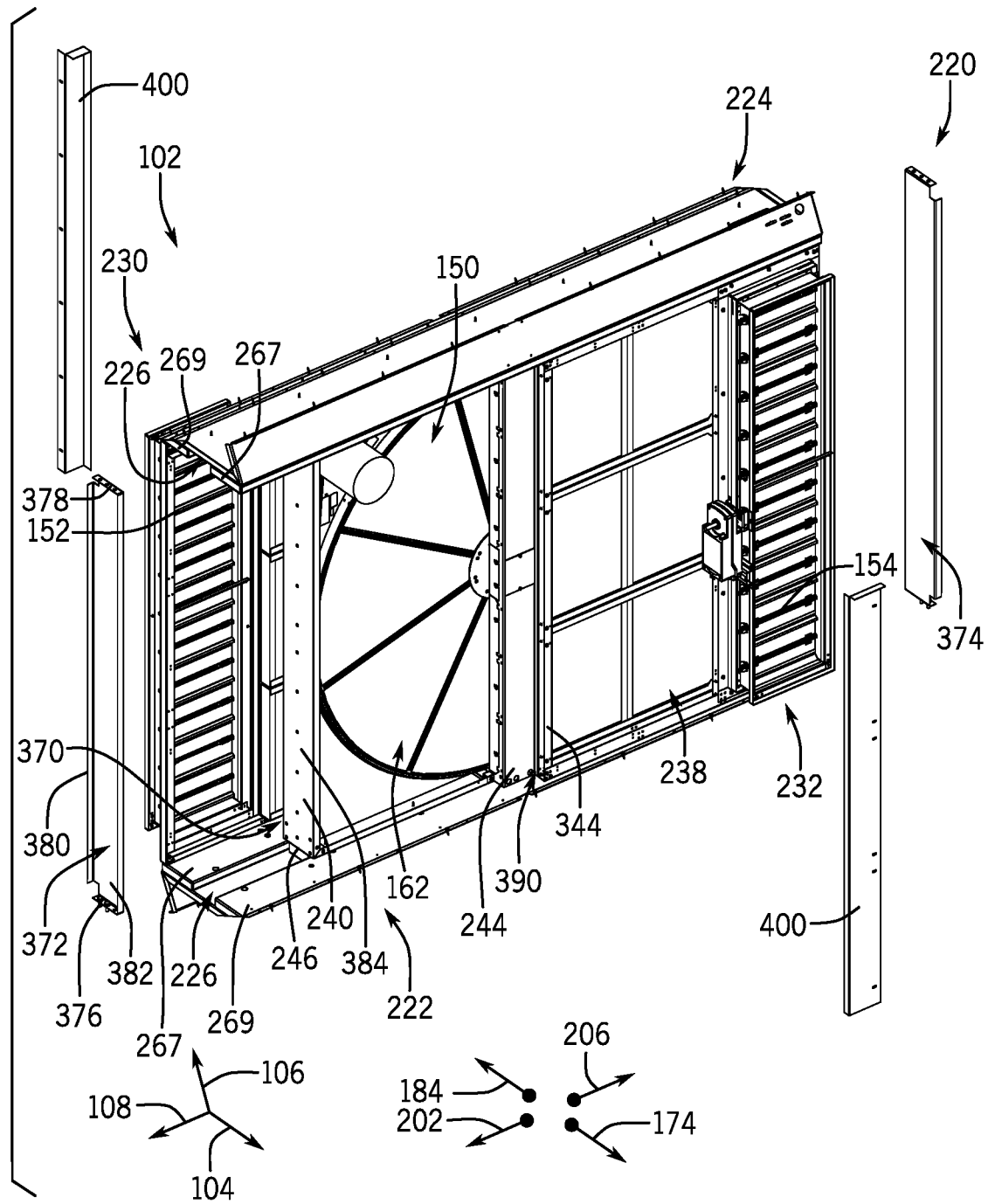
FIG. 19 is a perspective view of an embodiment of an energy recovery wheel assembly having an energy recovery wheel in an installed position, in accordance with an aspect of the present disclosure.

FIG. 19 is a perspective view of an embodiment of the ERW assembly 102. In some embodiments, an axial gap 370 may extend between the first subframe assembly 230 and the frame assembly 240 when the energy recovery wheel 150 is in the installed position. Similarly, another axial gap may extend between second subframe assembly 232 and the frame assembly 240 in the installed position of the energy recovery wheel 150. These axial gaps 370 may ensure that the energy recovery wheel 150 does not contact or interfere with the first subframe assembly 230 and/or the second subframe assembly 232 to enable relatively unrestricted translational movement of the energy recovery wheel 150 along the railing system 200. For example, the axial gaps 370 may ensure that manufacturing tolerances of the first and second subframe assemblies 230, 232 and/or manufacturing tolerances of any other component(s) of the ERW assembly 102 do not result in binding or undesired interference between the energy recovery wheel 150 and the first and second subframe assemblies 230, 232.

The ERW assembly 102 may include a first block plate 372 and a second block plate 374 that are configured to block air flow through the axial gaps 370 during operation of the HVAC system 100. For example, the first block plate 372 may include a first mounting flange 376 and a second mounting flange 378 that enable suitable fasteners to couple the first block plate 372 to the head member 267 of the first support rail 222 and the tail member 269 of the second support rail 224. A sealing flange 380 of the first block plate 372 is configured to engage with the first subframe assembly 230, while a back member 382 of the first block plate 372 is configured to engage with a side surface 384 of the frame assembly 240. As a result, the first block plate 372 may substantially block air flow through the axial gap 370 formed between the first subframe assembly 230 and the frame assembly 240, while simultaneously blocking movement of the energy recovery wheel 150 in the sliding direction 202.

The second block plate 374 may be substantially similar to the first block plate 372. Accordingly, the second block plate 374 may engage with the second subframe assembly 232 and the frame assembly 240 to substantially block air flow through the axial gap between the frame assembly 240 and the second subframe assembly 232. In addition, the second block plate 374 restricts translational movement of the energy recovery wheel 150 in the reverse sliding direction 206. In this manner, the first and second block plates 372, 374 may be used to secure the energy recovery wheel 150 relative to the ERW assembly 102 in the centered or installed configuration of the energy recovery wheel 150.

Figure 20:
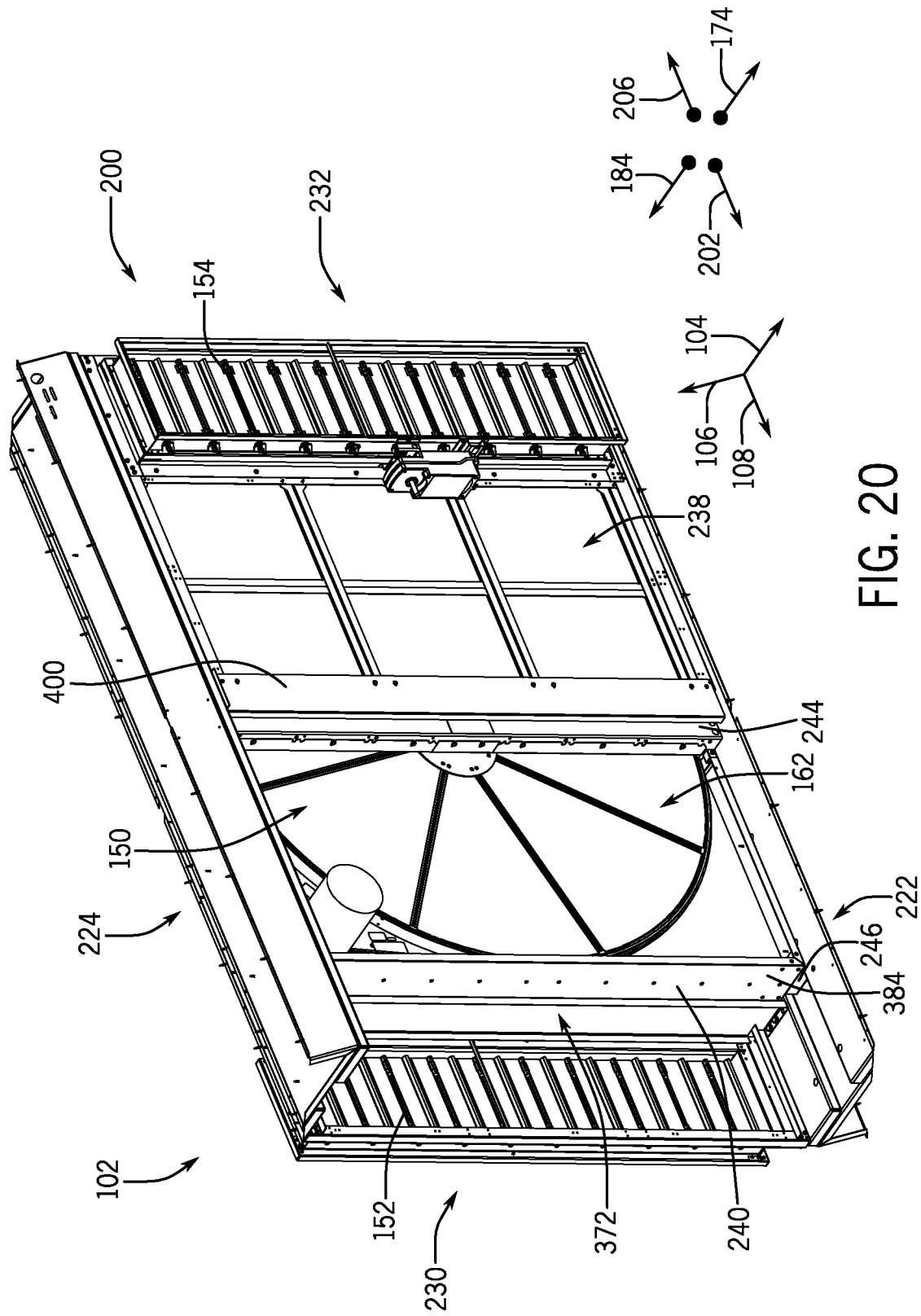
FIG. 20 is a perspective view of an embodiment of an energy recovery wheel assembly having an energy recovery wheel in an installed position, in accordance with an aspect of the present disclosure.

In certain embodiments, an additional axial gap 390 may extend between the second support rib 244 and the inner rail 344 of the second damper assembly 232. Similarly, an axial gap may extend between the first support rib 242 and the inner rail 344 of the first subframe assembly 230. Accordingly, the ERW assembly 102 may include a pair of central block plates 400 that are configured to extend across and cover the additional axial gap 390 and the axial gap between the first support rib 242 and the inner rail 344 of the first subframe assembly 230. Particularly, one of the central block plates 400 may couple to the inner rail 344 of the first subframe assembly 230 and engage with the first support rib 242, while another of the central block plates 400 may couple to the second subframe assembly 232 and engages with the second support rib 244. In this manner, the central block plates 400 may block air flow through the axial gap between the first subframe assembly 230 and the first support rib 242, and through the axial gap 390 between the second subframe assembly 232 and the second support rib 244. For example, FIG. 20 is a perspective view of an embodiment of the ERW assembly 102 in which the first block plate 372, the second block plate 374, and the central block plates 400 are coupled to the ERW assembly 102 in an assembled configuration. As shown, the central block plate 400 coupled to the inner rail 344 of the second subframe assembly 232 abuts the second support rib 244 and blocks air flow through the axial gap 390.

Figure 21:
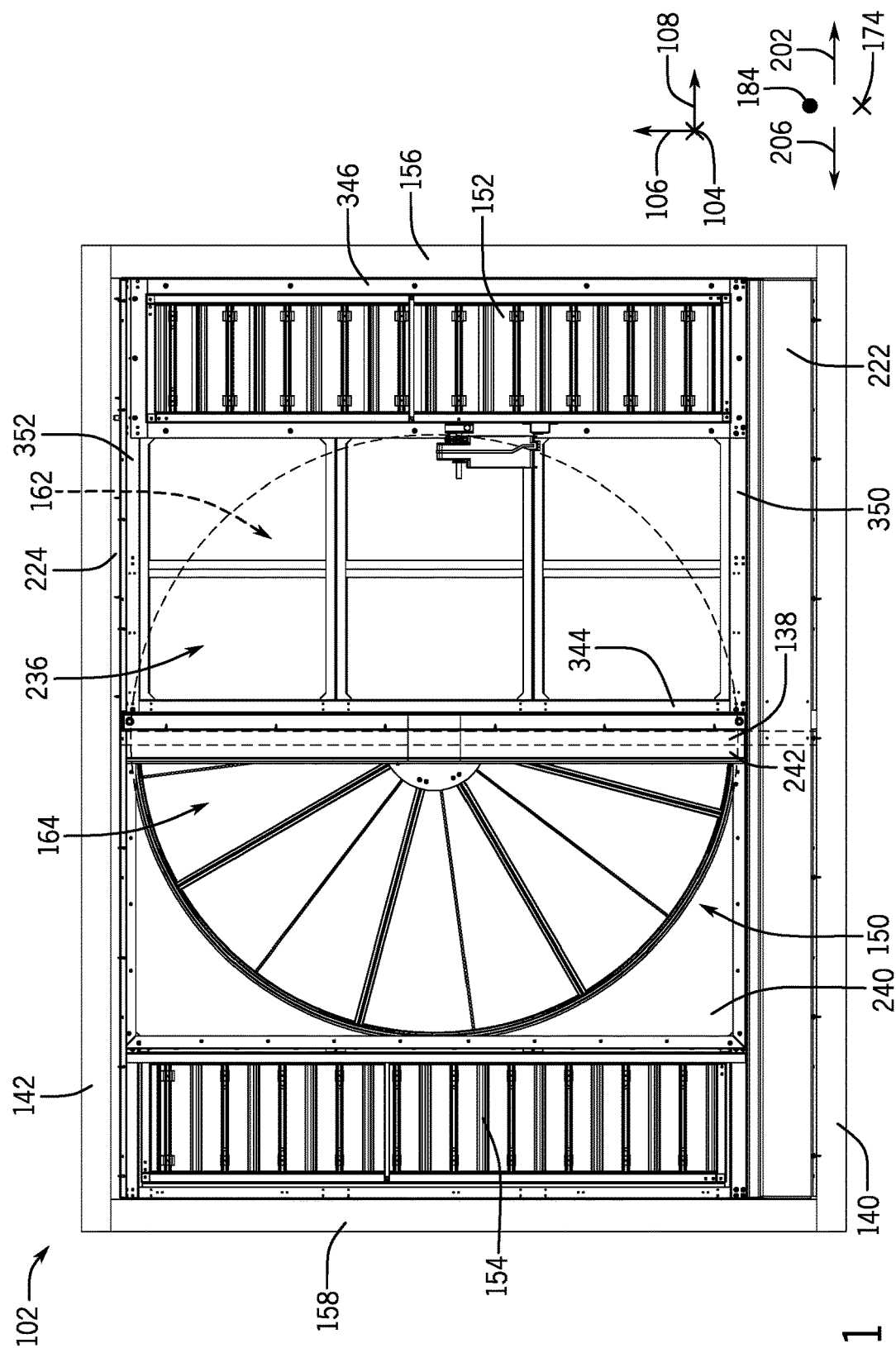
FIG. 21 is a cross-sectional view of an embodiment of an HVAC system having an energy recovery wheel assembly, in accordance with an aspect of the present disclosure.

FIG. 21 is a cross-sectional view of an embodiment of the HVAC system 100. As noted above, the partition 138 may divide an interior of the air distribution plenum 116 into the outdoor air flow path 146 and the return air flow path 148. In particular, the outdoor air flow path 146 may extend between the partition 138 and the first side panel 156 of the enclosure 132, while the return air flow path 148 extends between the partition 138 and the second side panel 158 of the enclosure 132. As shown in the illustrated embodiment, the first filter array 236 extends from the partition 138 along the energy recovery wheel 150 with respect to the lateral axis 108, such that the first filter array 236 overlaps with the energy recovery wheel 150 relative to a flow direction of the outdoor air 172 along the outdoor air flow path 146. In other words, a width of the first filter array 236 may exceed a dimension between the partition 138 and an outermost edge of the first portion 162 of the energy recovery wheel 150. In this manner, substantially all of the outdoor air 172 is filtered by the first filter array 236 before flowing across the first portion 162 of the energy recovery wheel 150. The outdoor air bypass damper 152 is laterally offset from the energy recovery wheel 150 relative to a flow direction of the outdoor air 172 along the outdoor air flow path 146. That is, the outdoor air bypass damper 152 is disposed adjacent to the first filter array 236 along the lateral axis 108, such that the outdoor air bypass damper 152 may not overlap with the energy recovery wheel 150. Accordingly, when the outdoor air bypass damper 152 is open, such as when the energy recovery wheel 150 is inactive or non-operational, the outdoor air 172 may flow along the outdoor air flow path 146 in the first direction 174 and through the outdoor air bypass damper 152 while bypassing the energy recovery wheel 150.

It should be appreciated that the second filter array 238 may overlap with the energy recovery wheel 150 in a similar manner to that of the first filter array 236. Particularly, the second filter array 238 may extend from the partition 138 and beyond an outermost edge of the second portion 164 of the energy recovery wheel 150, with respect to the lateral axis 108, such that substantially all return air 180 flowing along the return air flow path 148 is filtered by the second filter array 238 before flowing across the second portion 164 of the energy recovery wheel 150. As shown in the illustrated embodiment, the return air bypass damper 154 is offset from the energy recovery wheel 150 to enable flow of return air 180 through the return air bypass damper 154 to avoid interaction with the energy recovery wheel 150 when the energy recovery wheel 150 is inactive or non-operational.

Figure 23:
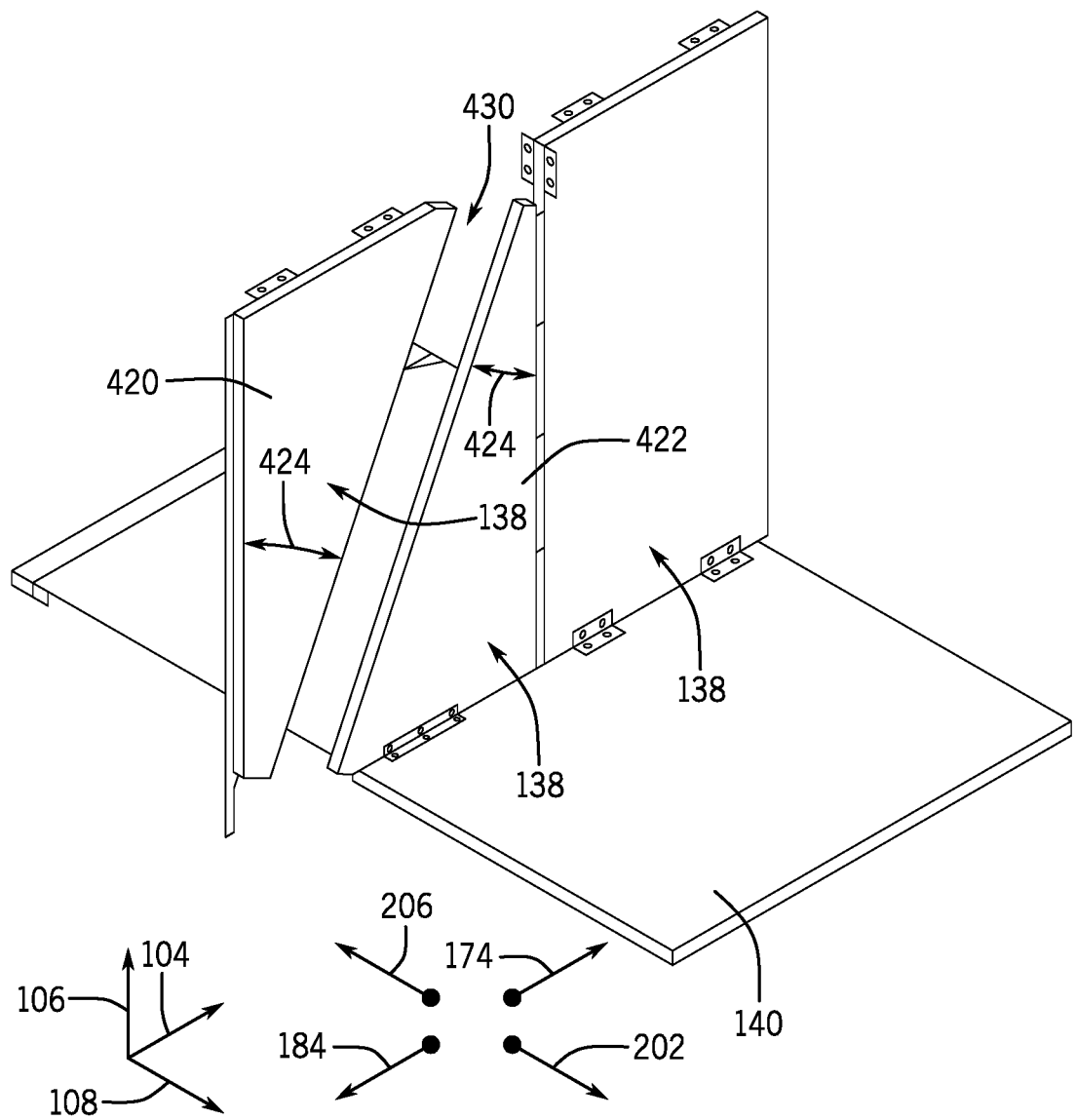
FIG. 23 is a perspective view of an embodiment of a partition configured to receive an energy recovery wheel assembly, in accordance with an aspect of the present disclosure.

FIG. 22 is a side view of an embodiment of the ERW assembly 102 and a portion of the partition 138. The partition 138 may include a first inclined partition member 420 and a second inclined partition member 422 that are disposed on opposing sides of the energy recovery wheel 150 relative to air flow across the ERW assembly 102. The first inclined partition member 420 may couple to or engage with the inner rail 344 of the first subframe assembly 230, while the second inclined partition member 422 may couple to or engage with the inner rail 344 of the second subframe assembly 232. Additionally or alternatively, the first inclined partition member 420 may couple to or engage with the central block plate 400 that may be coupled to the inner rail 344 of the first subframe assembly 230, while the second inclined partition member 422 may couple to or engage with the central block plate 400 that may be coupled to the inner rail 344 of the second subframe assembly 232. Accordingly, the first and second inclined partition members 420, 422 may form a substantially fluidic seal across the energy recovery wheel 150 to block air flow between the outdoor air flow path 146 and the return air flow path 148. As shown in the illustrated embodiment, the first and second inclined partition members 420, 422 may include a generally triangular shape having angles 424 that are complementary to the angle 266. To further illustrate, FIG. 23 is a side view of an embodiment of the partition 138 having the first and second inclined partition members 420, 422. As shown in the illustrated embodiment, first inclined partition member 420 and the second inclined partition member 422 are separated to define an opening 430 that is configured to receive the energy recovery wheel 150 and certain portions of the ERW assembly 102.

Accordingly, the energy recovery wheel 150 may extend through the opening 430 and may span across the outdoor air flow path 146 and the return air flow path 148. A geometry of the opening 430 may be selected to conform to a cross-sectional shape or profile of the ERW assembly 102, such that air flow through the opening 430 between the outdoor air flow path 146 and the return air flow path 148 is substantially mitigated.

Figure 24:
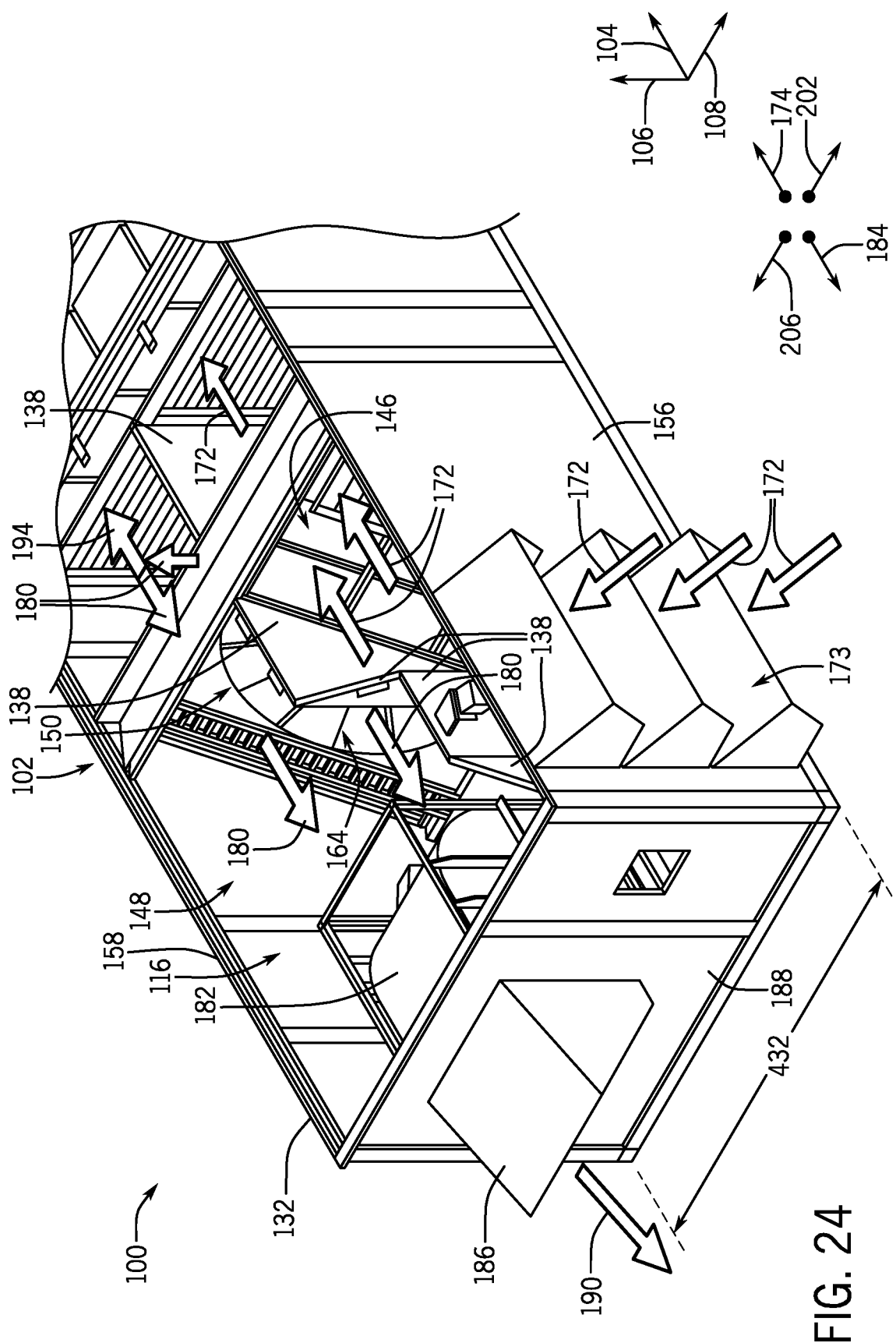
FIG. 24 is an expanded perspective view of an embodiment of an HVAC system having an energy recovery wheel assembly, in accordance with an aspect of the present disclosure.

FIG. 24 is another perspective view of an embodiment of the air distribution plenum 116. In some embodiments, the partition 138 may diverge from the ERW assembly 102 toward the first side panel 156 of the enclosure 132 along the second direction 184. In other words, the partition 138 may diverge toward the first side panel 156 in a flow direction of the return air 180 along the return air flow path 148. As a result, a width of the return air flow path 148 near the end panel 188 of the enclosure 132 may be relatively large, as compared to a width of the outdoor air flow path 146 near the end panel 188. For example, as shown in the illustrated embodiment, the width of the return air flow path 148 at the end panel 188 may include substantially all of a width 432 of the air distribution plenum 116. In this manner, the partition 138 may enable the exhaust blower 182 to extend across a substantial portion of the width of the enclosure 132, thereby enabling installation of a relatively large exhaust blower 182 within the enclosure 132. Accordingly, the relatively large exhaust blower 182 may facilitate an improved draw of return air 180 into the air distribution plenum 116 and across the second portion 164 of the energy recovery wheel 150.

Technical effects of the ERW assembly 102 include improved access to the energy recovery wheel 150 by enabling rapid removal of the energy recovery wheel 150 without removal and/or disassembly of other climate management components adjacent the ERW assembly 102. Accordingly, the configuration of the ERW assembly 102 may reduce a time period during which a service technician performs maintenance operations on the energy recovery wheel 150, such as when the service technician cleans the energy recovery wheel 150 or replaces the energy recovery wheel 150 with another energy recovery wheel. Therefore, the ERW assembly 102 may reduce a lapse of time between operational periods of the HVAC system 100 throughout which the maintenance operations on the energy recovery wheel 150 are performed, which may increase an efficiency of the HVAC system 100. Moreover, the ERW assembly 102 enables a slanted orientation of the energy recovery wheel 150 within the enclosure 132, thereby enabling a relatively large or oversized energy recovery wheel 150 to be positioned within the enclosure 132 without height modification to the enclosure 132. A larger energy recovery wheel 150 may increase a rate of heat transfer between the outdoor air 172 and the return air 180, thereby enabling the ERW assembly 102 to recover more thermal energy from the return air 180 before the return air 180 discharges from the enclosure 132. As such, the implementation of an oversized energy recovery wheel 150 may enhance an efficiency of the HVAC system 100.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
  a railing system coupled to an enclosure of the HVAC system, wherein the railing system comprises a first support rail and a second support rail;

an energy recovery wheel engaged with the railing system and configured to move along the railing system between an installed configuration and an extracted configuration, wherein, in the installed configuration, the energy recovery wheel is positioned within a first air flow path of the enclosure and within a second air flow path of the enclosure; and a bypass damper positioned within the enclosure and adjacent to the energy recovery wheel in the installed configuration of the energy recovery wheel, wherein the bypass damper is configured to enable air flow along the first air flow path to bypass the energy recovery wheel and flow from a first side of the energy recovery wheel to a second side of the energy recovery wheel, and wherein the bypass damper extends from the first support rail to the second support rail.

2. The HVAC system of claim 1, wherein, in the extracted configuration, the energy recovery wheel is removed from the first air flow path, the second air flow path, or both.

3. The HVAC system of claim 1, wherein the energy recovery wheel is configured to translate along the railing system independently of the bypass damper.

4. The HVAC system of claim 1, wherein, in the installed configuration of the energy recovery wheel, the energy recovery wheel and the bypass damper cooperatively extend across the first air flow path.

5. The HVAC system of claim 1, wherein the bypass damper is a first bypass damper, wherein the HVAC system comprises a second bypass damper positioned adjacent to the energy recovery wheel in the installed configuration of the energy recovery wheel, and wherein the first bypass damper and the second bypass damper are positioned on opposite sides of the energy recovery wheel in the installed configuration of the energy recovery wheel.

6. The HVAC system of claim 5, wherein, in the installed configuration of the energy recovery wheel, the energy recovery wheel and the first bypass damper cooperatively extend across the first air flow path, and the energy recovery wheel and the second bypass damper cooperatively extend across the second air flow path.

7. The HVAC system of claim 1, comprising:
a partition of the enclosure; and
a side panel of the enclosure, wherein the partition and the side panel define at least a portion of the first air flow path extending between the partition and the side panel, and wherein the energy recovery wheel and the bypass damper cooperatively extend between the partition and the side panel in the installed configuration of the energy recovery wheel.

8. The HVAC system of claim 1, wherein the first support rail and the second support rail are configured to engage with and support the energy recovery wheel to guide translation of the energy recovery wheel between the installed configuration and the extracted configuration, and wherein the first support rail and the second support rail are disposed on opposite sides of the energy recovery wheel in the installed configuration of the energy recovery wheel.

9. An energy recovery wheel assembly for a heating, ventilation, and/or air conditioning (HVAC) system, comprising:
support rails configured to couple to an enclosure of the HVAC system;
an energy recovery wheel configured to be supported by the support rails; and
bypass dampers configured to mount adjacent to the energy recovery wheel, couple to the support rails, and extend between the support rails, wherein the energy recovery wheel is configured to move along the support rails relative to the bypass dampers in an assembled configuration of the HVAC system, wherein the bypass dampers are configured to enable air flow to bypass the energy recovery wheel and flow between a first side of the energy recovery wheel and a second side of the energy recovery wheel.

10. The energy recovery wheel assembly of claim 9, wherein the energy recovery wheel comprises a heat transfer portion and a frame assembly, wherein the heat transfer portion is formed from a plurality of heat transfer elements rotatably coupled to the frame assembly, and wherein the energy recovery wheel is configured to engage with the support rails via the frame assembly.

11. The energy recovery wheel assembly of claim 10, wherein the support rails are positioned on diametrically opposite sides of the heat transfer portion in the assembled configuration of the HVAC system.

12. The energy recovery wheel assembly of claim 10, wherein the bypass dampers are positioned on diametrically opposite sides of the heat transfer portion in the assembled configuration of the HVAC system.

13. The energy recovery wheel assembly of claim 9, wherein respective width dimensions of the support rails extend cross-wise to respective height dimensions of the bypass dampers in the assembled configuration of the HVAC system.

14. The energy recovery wheel assembly of claim 9, comprising a partition of the enclosure, wherein the partition defines at least a portion of a first air flow path and a second air flow path through the enclosure, wherein the energy recovery wheel is positioned within the first air flow path and the second air flow path in the assembled configuration of the HVAC system.

15. A heating, ventilation, and/or air conditioning (HVAC) system, comprising:
an enclosure comprising a partition defining a first air flow path and a second air flow path through the enclosure;
a railing system coupled to the enclosure and comprising two or more support rails;
an energy recovery wheel slideably coupled to the railing system and configured to translate along the railing system between an installed configuration within the enclosure and an extracted configuration external to the enclosure; and
a bypass damper positioned within the enclosure and extending between the two or more support rails of the railing system, wherein, in the installed configuration of the energy recovery wheel, the energy recovery wheel and the bypass damper form a portion of the first air flow path, and wherein the bypass damper is configured to direct air flow along the first air flow path to bypass the energy recovery wheel and flow from a first side of the energy recovery wheel to a second side of the energy recovery wheel.

16. The HVAC system of claim 15, comprising an additional bypass damper positioned within the enclosure, wherein, in the installed configuration of the energy recovery wheel, the energy recovery wheel or the additional bypass damper form a portion of the second air flow path.

17. The HVAC system of claim 16, wherein, in the installed configuration of the energy recovery wheel, the bypass damper and the additional bypass damper are disposed on opposite sides of the energy recovery wheel.

18. The HVAC system of claim 16, comprising a first panel of the enclosure and a second panel of the enclosure, wherein the first panel and the second panel are disposed on opposite sides of the partition, and wherein, in the installed configuration of the energy recovery wheel, the bypass damper extends between the first panel and the energy recovery wheel, and the additional bypass damper extends between the second panel and the energy recovery wheel.

19. The HVAC system of claim 15, wherein the two or more support rails comprise a first support rail and a second support rail, the energy recovery wheel comprises a first end portion and a second end portion, opposite the first end portion, the first end portion is configured to slideably engage with the first support rail, and the second end portion is configured to slideably engage with the second support rail.

20. The HVAC system of claim 15, wherein the energy recovery wheel is configured to translate along the railing system independently of the bypass damper.

* * * * *